US011203261B2

(12) United States Patent
Ciccone et al.

(10) Patent No.: US 11,203,261 B2
(45) Date of Patent: Dec. 21, 2021

(54) SYSTEMS AND METHODS FOR CONTROLLING AIR INDUCTION TO AN ENGINE OF A VEHICLE

(71) Applicant: Ford Global Technologies, LLC, Dearborn, MI (US)

(72) Inventors: Thomas Joseph Ciccone, Madison Heights, MI (US); Jaymin Joseph, Walled Lake, MI (US); Joseph Ovalles Quinones, Dearborn, MI (US); James Patrick Cahill, Royal Oak, MI (US); Trenton Lee McMillion, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 16/709,793

(22) Filed: Dec. 10, 2019

(65) Prior Publication Data
US 2021/0170860 A1      Jun. 10, 2021

(51) Int. Cl.
*F02M 35/16*       (2006.01)
*B60K 13/02*       (2006.01)

(52) U.S. Cl.
CPC ............ *B60K 13/02* (2013.01); *F02M 35/16* (2013.01)

(58) Field of Classification Search
CPC .. F02D 41/0002; F02M 31/042; F02M 35/10; F02M 35/10144; F02M 35/10255; F02M 35/104; F02M 35/108; B60K 30/02
(Continued)

(56) References Cited

U.S. PATENT DOCUMENTS

| 663,173 A | * | 12/1900 | Hoy | .......................... B63C 9/06 114/349 |
| 3,199,486 A | | 8/1965 | Gillois et al. | |

(Continued)

FOREIGN PATENT DOCUMENTS

| CN | 205292164 U | 6/2016 |
| CN | 207370989 U | 5/2018 |

(Continued)

OTHER PUBLICATIONS

Mitchell, J., "How Does A 4WD Snorkel Work?," Offroad Aussie Website, Available Online at https://www.offroadaussie.com/how-does-a-4wd-snorkel-work/, Retrieved on Feb. 18, 2020, 11 pages.
(Continued)

*Primary Examiner* — George C Jin
*Assistant Examiner* — Teuta B Holbrook
(74) *Attorney, Agent, or Firm* — Geoffrey Brumbaugh; McCoy Russell LLP

(57) ABSTRACT

Methods and systems are provided for controlling an airflow to an engine via a primary air induction pathway or a secondary air induction pathway, where the secondary air induction pathway routes the airflow to the engine via a deployable snorkel system. Thus, in one example, a method comprises routing the airflow to the engine solely via the primary air induction pathway by commanding open a first air inlet valve and commanding closed a second air inlet valve, and responsive to a request to switch the routing, commanding closed the first air inlet valve and commanding open the second air inlet valve. In this way, the snorkel system may selectively be used in response to requests from a vehicle operator.

18 Claims, 12 Drawing Sheets

(58) Field of Classification Search
USPC .................................................. 123/184.52
See application file for complete search history.

(56) References Cited

U.S. PATENT DOCUMENTS

| | | | |
|---|---|---|---|
| 3,844,202 A * | 10/1974 | Ferguson | B60H 1/00378 |
| | | | 454/143 |
| 5,358,442 A * | 10/1994 | Ekinci | B60H 1/262 |
| | | | 454/143 |
| 6,453,866 B1 * | 9/2002 | Altmann | F02M 35/10013 |
| | | | 123/184.21 |
| 6,510,832 B2 * | 1/2003 | Maurer | F02M 35/10013 |
| | | | 123/198 E |
| 6,564,768 B2 * | 5/2003 | Bauer | F02M 35/024 |
| | | | 123/198 E |
| 7,207,851 B1 | 4/2007 | Gibbs et al. | |
| 7,393,372 B2 | 7/2008 | Cassell et al. | |
| 7,455,042 B2 * | 11/2008 | Jacobi-Hinderer | ........................ |
| | | | F02M 35/10013 |
| | | | 123/184.21 |
| 8,960,347 B2 | 2/2015 | Bennett | |
| 10,393,076 B1 | 8/2019 | Freeman et al. | |
| 10,514,007 B2 | 12/2019 | McCann et al. | |
| 2002/0059912 A1 * | 5/2002 | Bauer | F02M 35/024 |
| | | | 123/198 E |
| 2002/0083916 A1 * | 7/2002 | Maurer | F02M 35/161 |
| | | | 123/198 E |
| 2015/0240760 A1 | 8/2015 | Lewington et al. | |
| 2018/0073475 A1 * | 3/2018 | Stempien | F02M 35/088 |
| 2020/0208567 A1 * | 7/2020 | Hikitani | F02M 31/16 |
| 2020/0208731 A1 * | 7/2020 | Matsudo | F02M 35/0204 |

FOREIGN PATENT DOCUMENTS

| | | | |
|---|---|---|---|
| DE | 19613860 A1 * | 10/1997 | ........... F02M 35/161 |
| JP | 2006096175 A | 4/2006 | |

OTHER PUBLICATIONS

McCann, J., "Air Intake System for an Engine," U.S. Appl. No. 16/512,283, filed Jul. 15, 2019, 39 pages.

* cited by examiner

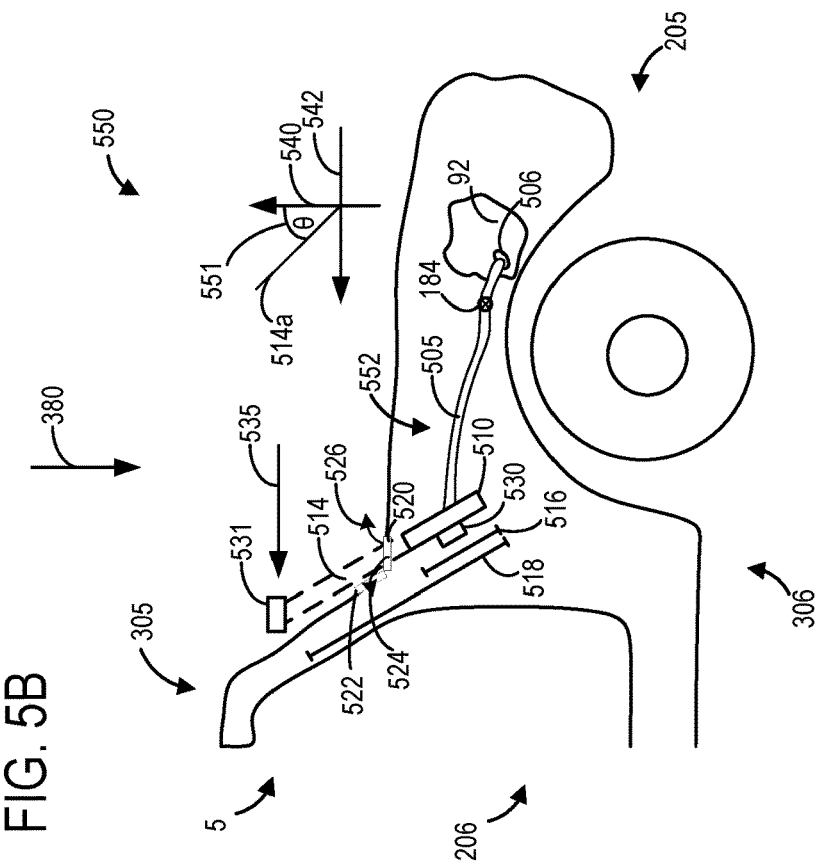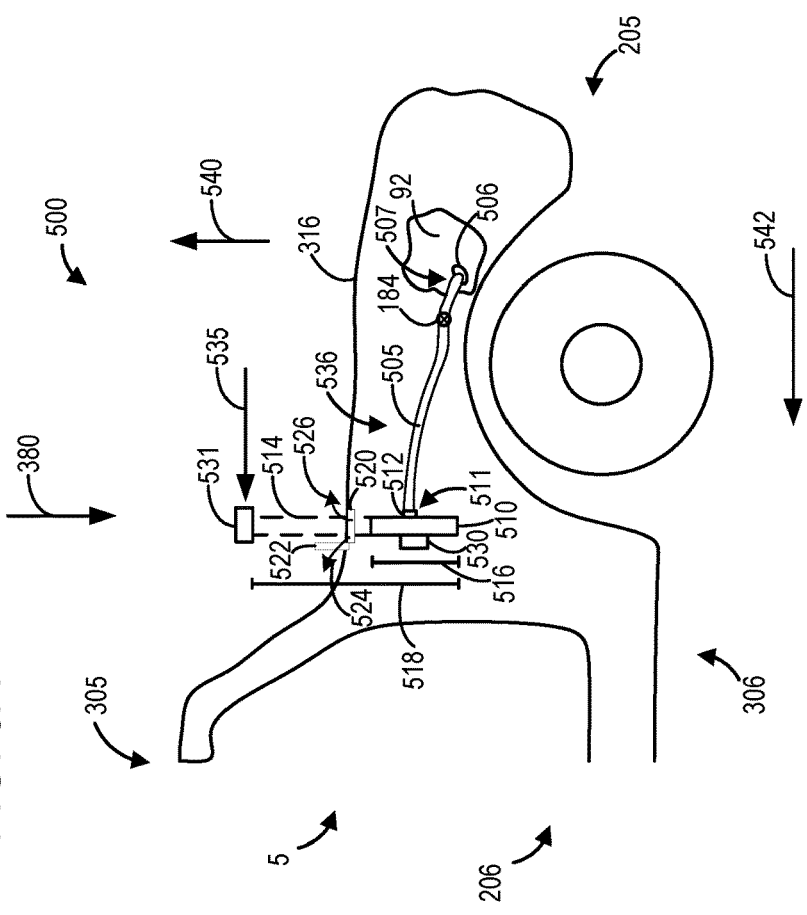

SYSTEMS AND METHODS FOR CONTROLLING AIR INDUCTION TO AN ENGINE OF A VEHICLE

FIELD

The present description relates generally to methods and systems for controlling whether air is inducted to an engine of a vehicle via a primary air induction pathway or a secondary air induction pathway.

BACKGROUND/SUMMARY

Vehicles may include air intakes that are located in an engine compartment of the vehicle, through which air may be drawn into the engine to be mixed with fuel. As a consequence, particulate matter raised during use of the vehicle during certain vehicle operating conditions such as off-roading in sandy or dusty environments has the potential to be ingested into the air intake. Along similar lines, if the vehicle is used to traverse a section of water (e.g., deep puddle, river or stream) that is deeper than a height of the air intake, some amount of water may be ingested to the engine. Water ingestion to the engine, if drawn into engine cylinders, can result in a hydrolock condition, which may result in immediate and potentially irreversible engine degradation.

To prevent such occurrence, it is known to rely on vehicle snorkel systems to increase a height at which air is drawn into the engine from atmosphere. Such snorkel systems may be utilized for military and commercial vehicles, for example, and may also be added to off-road vehicles by their owners. However, it is herein recognized that there are a number of undesirable issues associated with such snorkel systems, particularly as related to off-road vehicles that are used for purposes that include both non-off-road activities as well as occasional off-road activity. As one example, vehicle owners may find the look of the snorkel associated with the snorkel system unappealing at times when the vehicle is being utilized for non-off-road activity. As another example, installation of a snorkel system to a consumer vehicle may require the vehicle to be permanently modified, which may be undesirable to a customer for a number of reasons, including for example vehicle resale considerations.

U.S. Pat. No. 8,960,347 teaches a modular snorkel system for off-road vehicles that is virtually hidden, that can be installed in a vehicle without forming destructive holes in fenders or hoods, and that is configurable and reconfigurable with optional modules to form a variety of different snorkel configuration. However, the inventors have herein recognized issues with such a modular snorkel system. Specifically, the manner in which the modular snorkel system is configured renders air intake for the vehicle to always be via the snorkel system, which may result in degraded air supply to the engine in certain vehicle operating conditions. Furthermore, the modular nature of the snorkel system thus requires substantial vehicle operator manual intervention when particular snorkel system configurations are desired.

The inventors herein have recognized the above-mentioned issues, and have herein developed systems and methods to at least partially address them. In one example, a method comprises automatically deploying a snorkel associated with a vehicle snorkel system in response to a first request to deploy the snorkel being received at a controller of the vehicle, and automatically retracting the snorkel in response to a second request to retract the snorkel being received at the controller. The first request and the second request may include input from a vehicle operator to the controller, for example via a human machine interface or other actuator positioned in a cabin of the vehicle. In this way, the snorkel may be hidden from view when its use is not desired, and deployment of the snorkel may be controlled based on desires of a vehicle operator.

As one example, the method may further comprise routing an airflow to an engine of the vehicle via a primary air induction pathway and not the snorkel system during conditions where the snorkel is retracted, and routing the airflow to the engine via the snorkel system and not via the primary air induction pathway during conditions where the snorkel is deployed. For example, the method may include commanding closed a first air inlet valve included in the primary air induction pathway and commanding open a second air inlet valve associated with the snorkel system to route the airflow to the engine via the snorkel system, and commanding closed the second air inlet valve and commanding open the first air inlet valve to route the airflow to the engine via the primary air induction pathway.

As another example of the method, the method may further comprise commanding open an access door of the vehicle to allow the snorkel to deploy from a first, retracted position to a second, deployed position responsive to the first request, and commanding closed the access door responsive to an indication that the snorkel has adopted the first, retracted position responsive to the second request.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A-5C depict other embodiments of snorkel systems that are automatically deployable;

DETAILED DESCRIPTION

Figure 1:
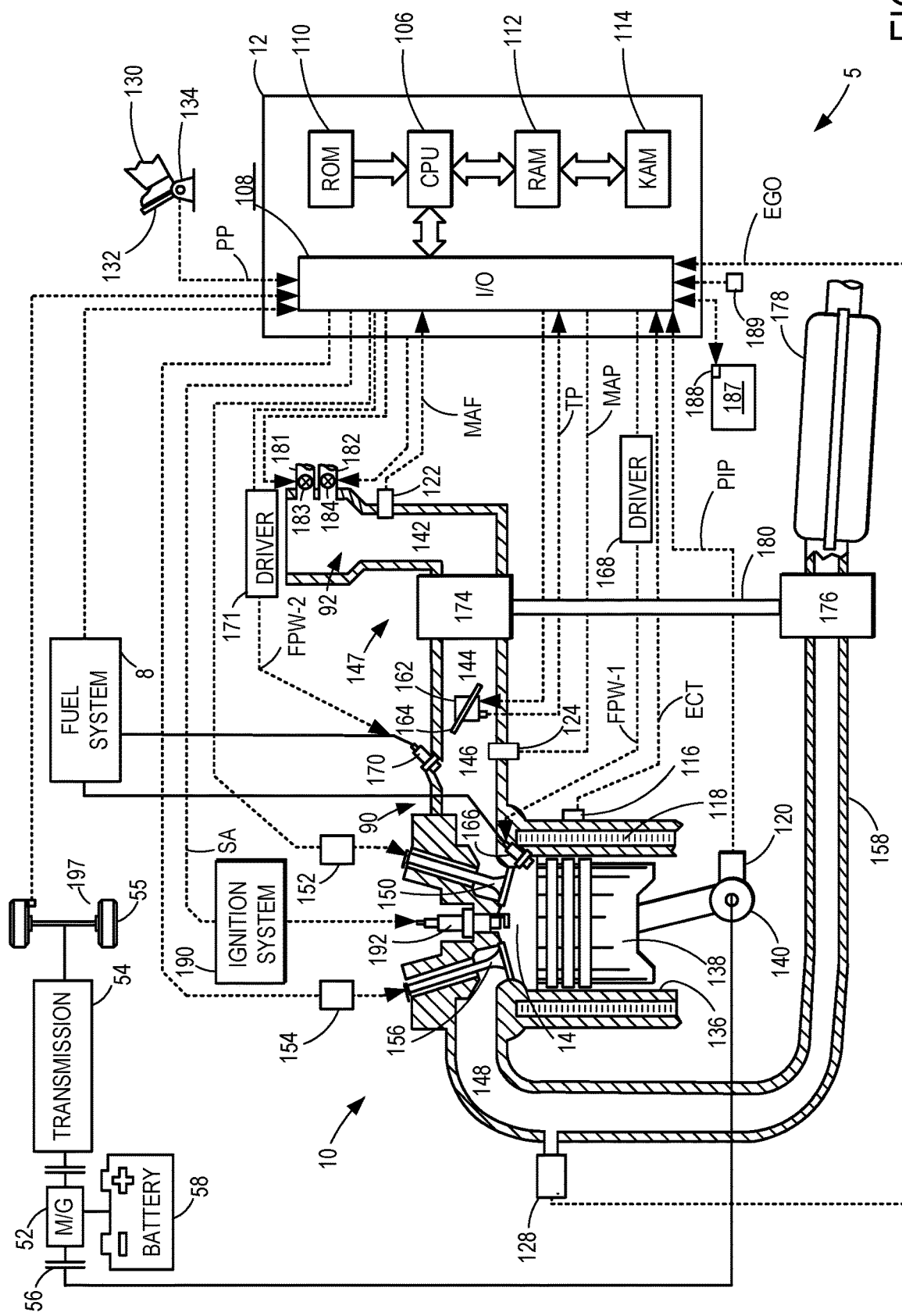
FIG. 1 depicts an engine system of a vehicle of the present disclosure.
Figure 2:
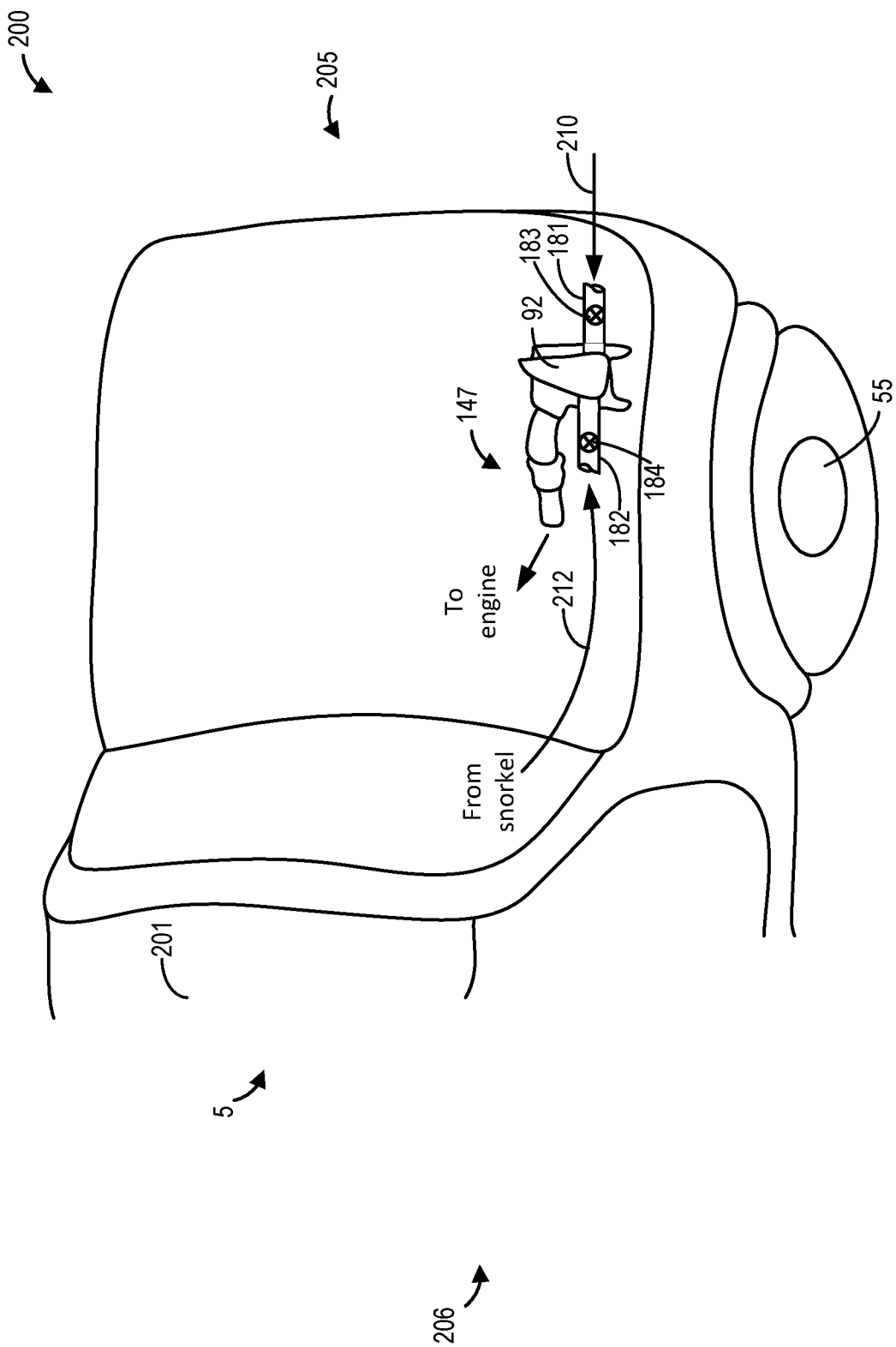
FIG. 2 depicts a top-down view of an engine compartment of a vehicle, to illustrate a first air inlet duct and a second air inlet duct for selectively providing air to an airbox an then to the engine of FIG. 1.

The following description relates to systems and methods for controlling whether air is inducted to an engine of a vehicle via a primary air induction pathway, or a secondary air induction pathway. The secondary air induction pathway may include an air induction pathway that is elevated in terms of where air enters the secondary air induction pathway as compared to the primary air induction pathway, such that the secondary air induction pathway may be used to avoid ingestion of water or other fluid and/or particulate matter into the engine under circumstances where such ingestion may occur if the primary air induction pathway were relied upon. Accordingly, an engine system of a vehicle is depicted at FIG. 1, showing an air box that includes a first air inlet duct (for the primary air induction pathway) and a second air inlet duct (for the secondary air induction pathway). The first air inlet duct may include a first air inlet valve, which may be a solenoid valve, a butterfly valve, etc., and for which a state of the valve may be controlled by a controller of the vehicle. The second air inlet duct may include a second air inlet valve, which may similarly be a solenoid valve, a butterfly valve, etc., and for which a state of the valve may be controlled via the controller of the vehicle. A top-down view of an engine compartment of the vehicle is depicted at FIG. 2, to illustrate how the first air inlet duct and the second air inlet duct are positioned with respect to each other and to the air box and air intake system of the vehicle.

Figure 3A:
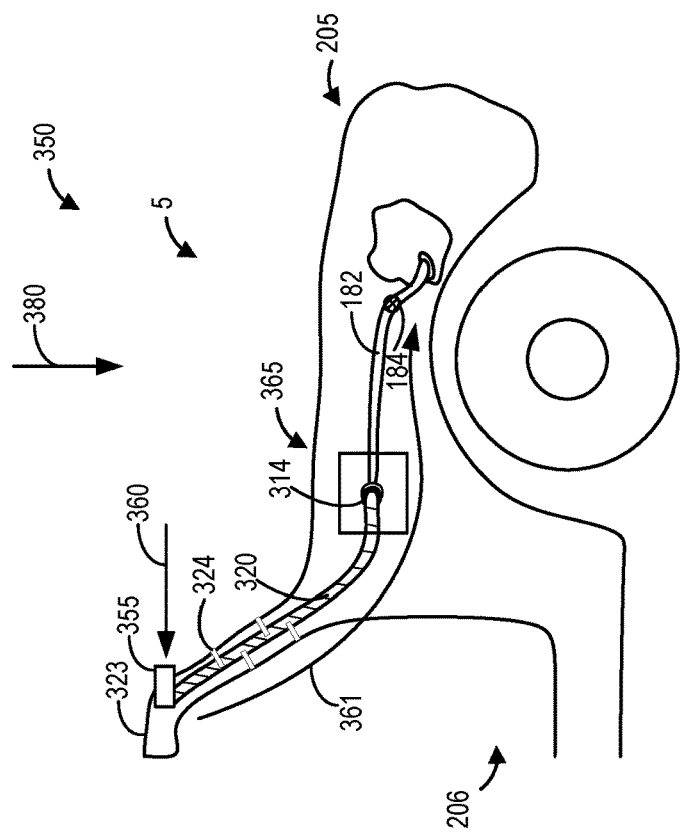
FIGS. 3A-3B depict example illustrations for a snorkel system that relies on some amount of manual assembly.
Figure 3B:
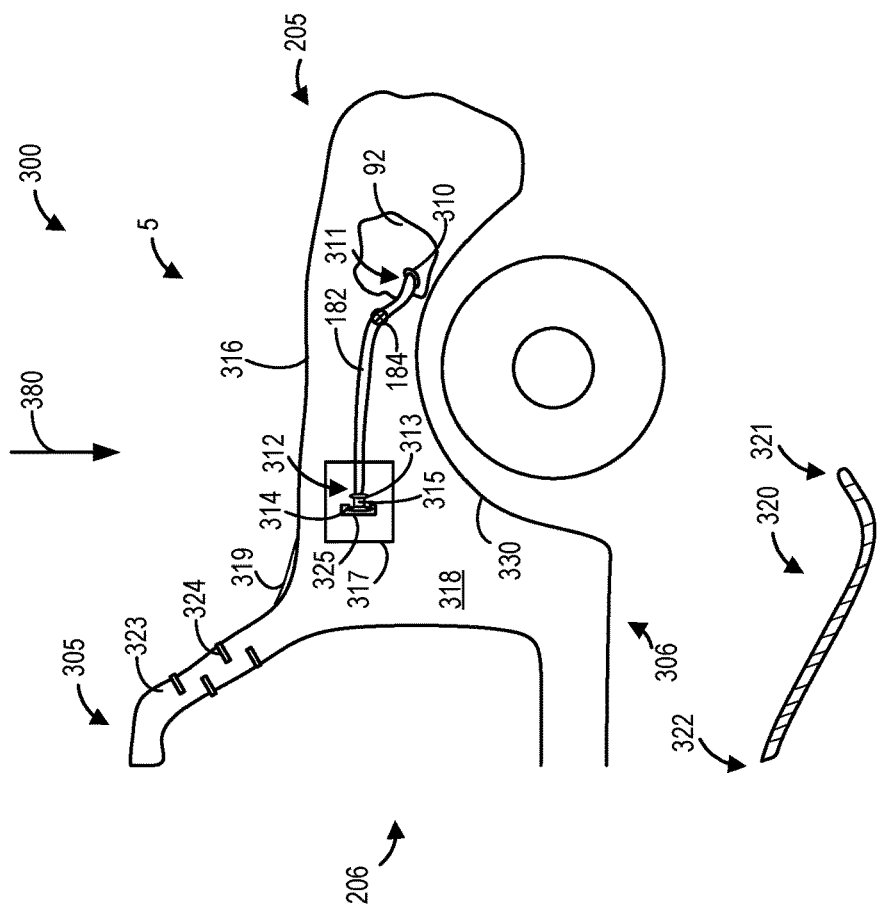
Figure 4:
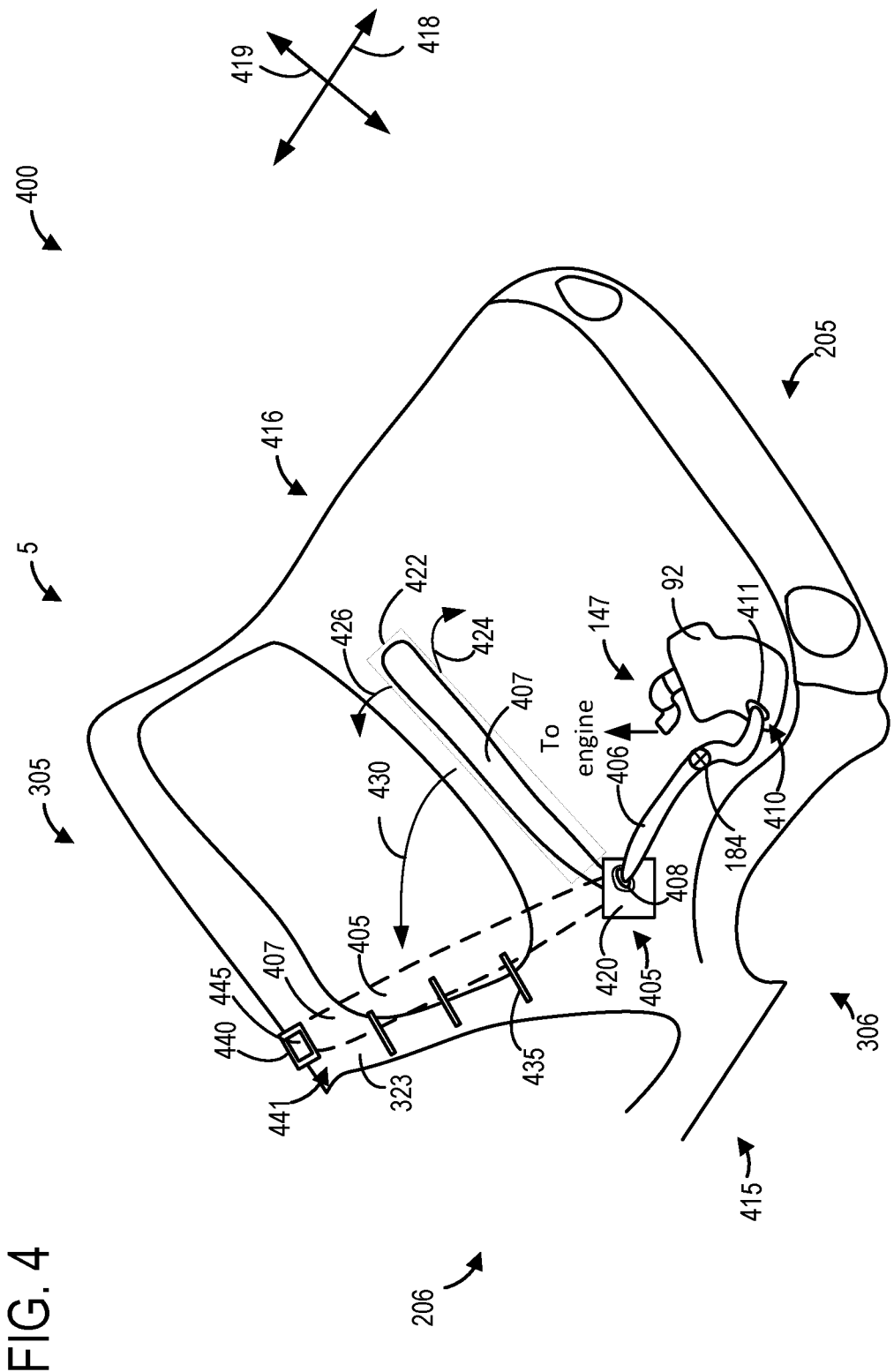
FIG. 4 depicts an example illustration of a snorkel system that is automatically deployable.
Figure 5D:
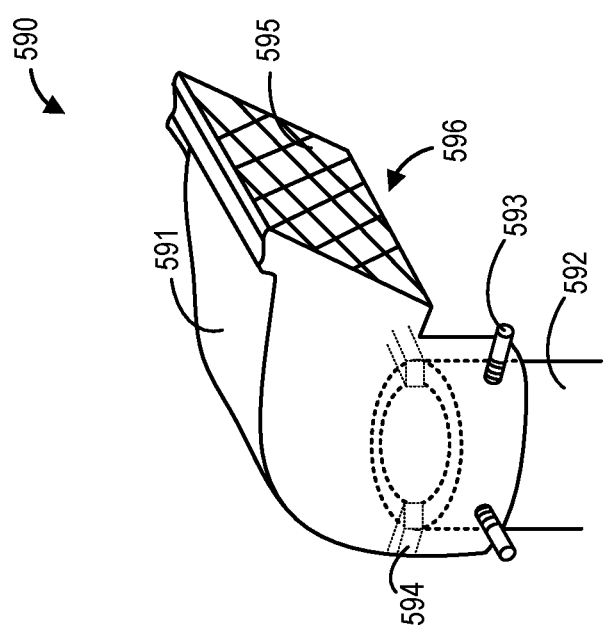
FIG. 5D depicts an example of a snorkel head that can be attached to a snorkel of a snorkel system of the present disclosure.
Figure 5C:
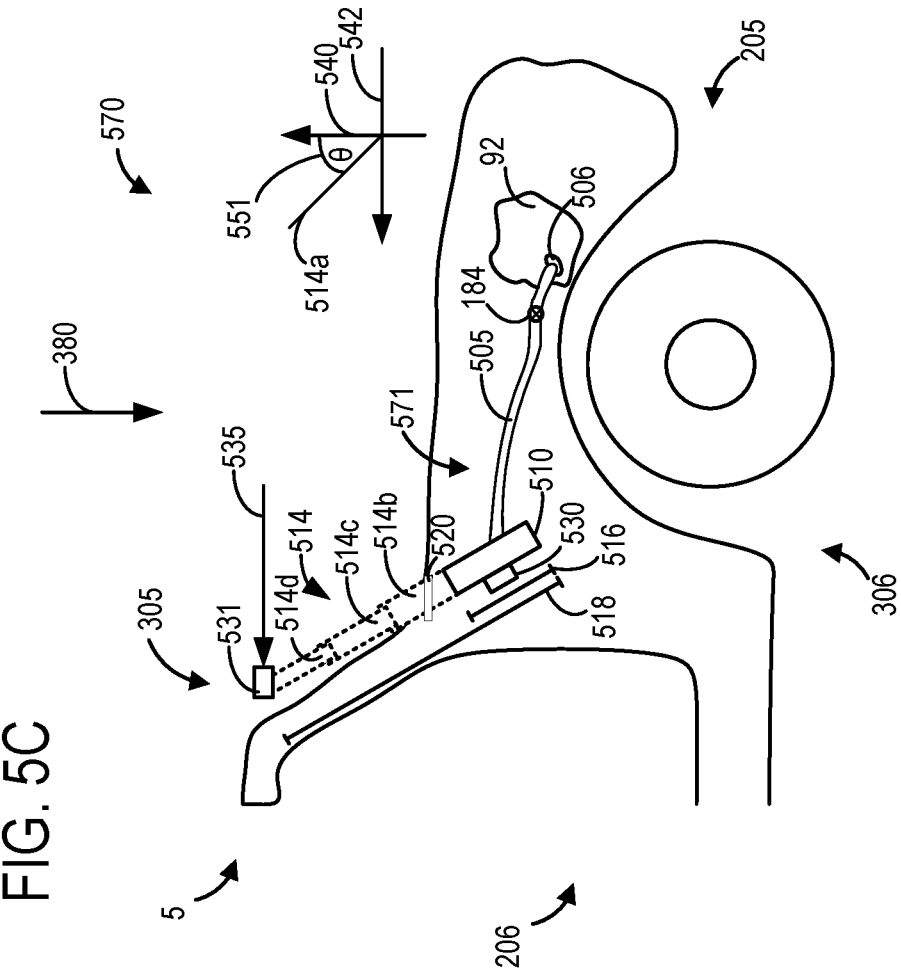

Air induction to the engine by way of the secondary air induction pathway may be via a snorkel system. FIGS. 3A-3B depict one example embodiment of a snorkel system of the present disclosure that may be at least partially manually assembled. Alternatively, FIGS. 4-5C depict examples of snorkel systems of the present disclosure that are automatically deployable. Whether the snorkel systems are automatic or manually deployable, a snorkel head cap may in some examples be used. An example of such a snorkel head cap is depicted at FIG. 5D.

Figure 6:
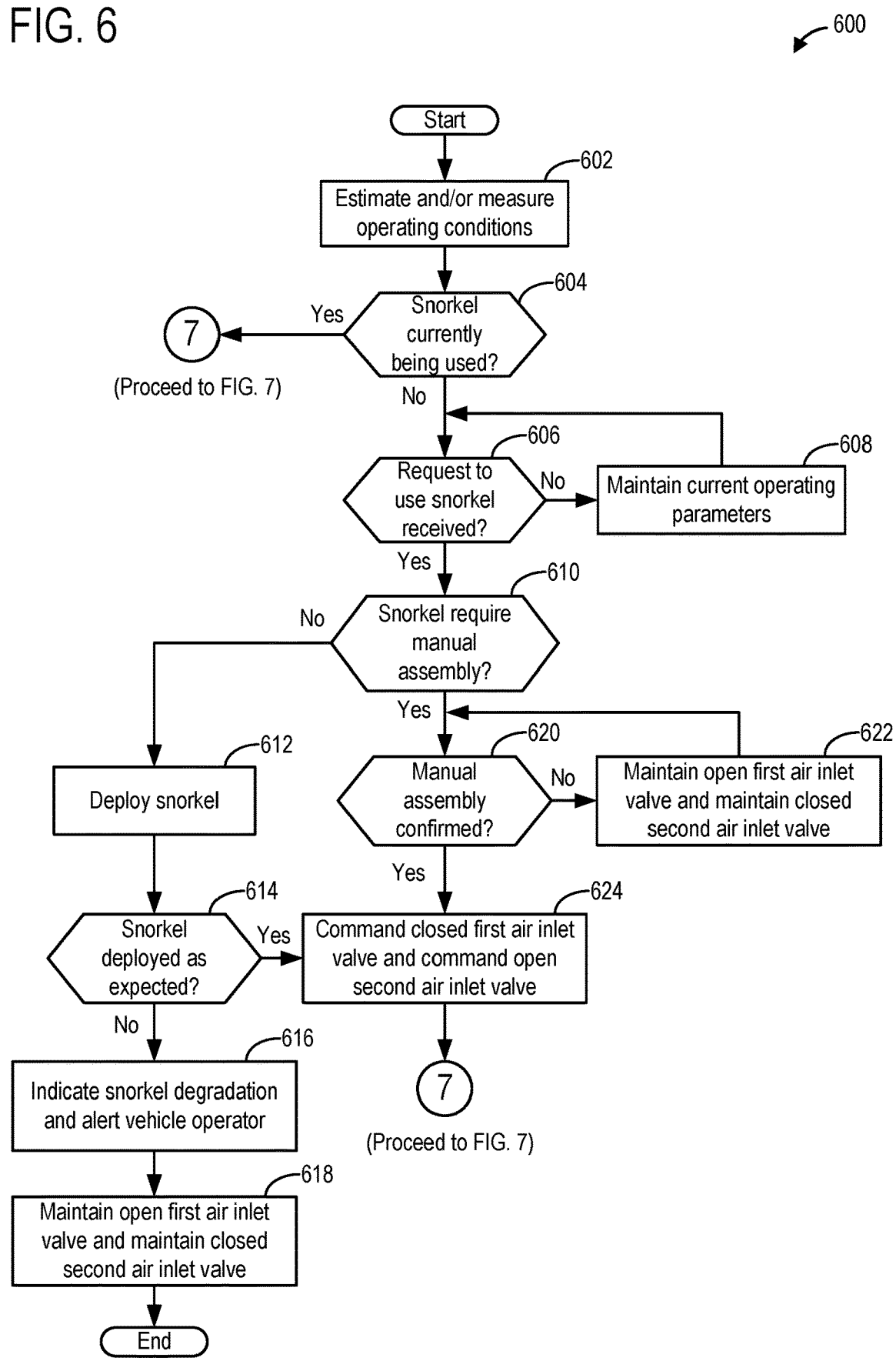
FIGS. 6-7 depict an example method for controlling whether air is inducted to the engine via a primary air induction pathway or a secondary air induction pathway.
Figure 7:
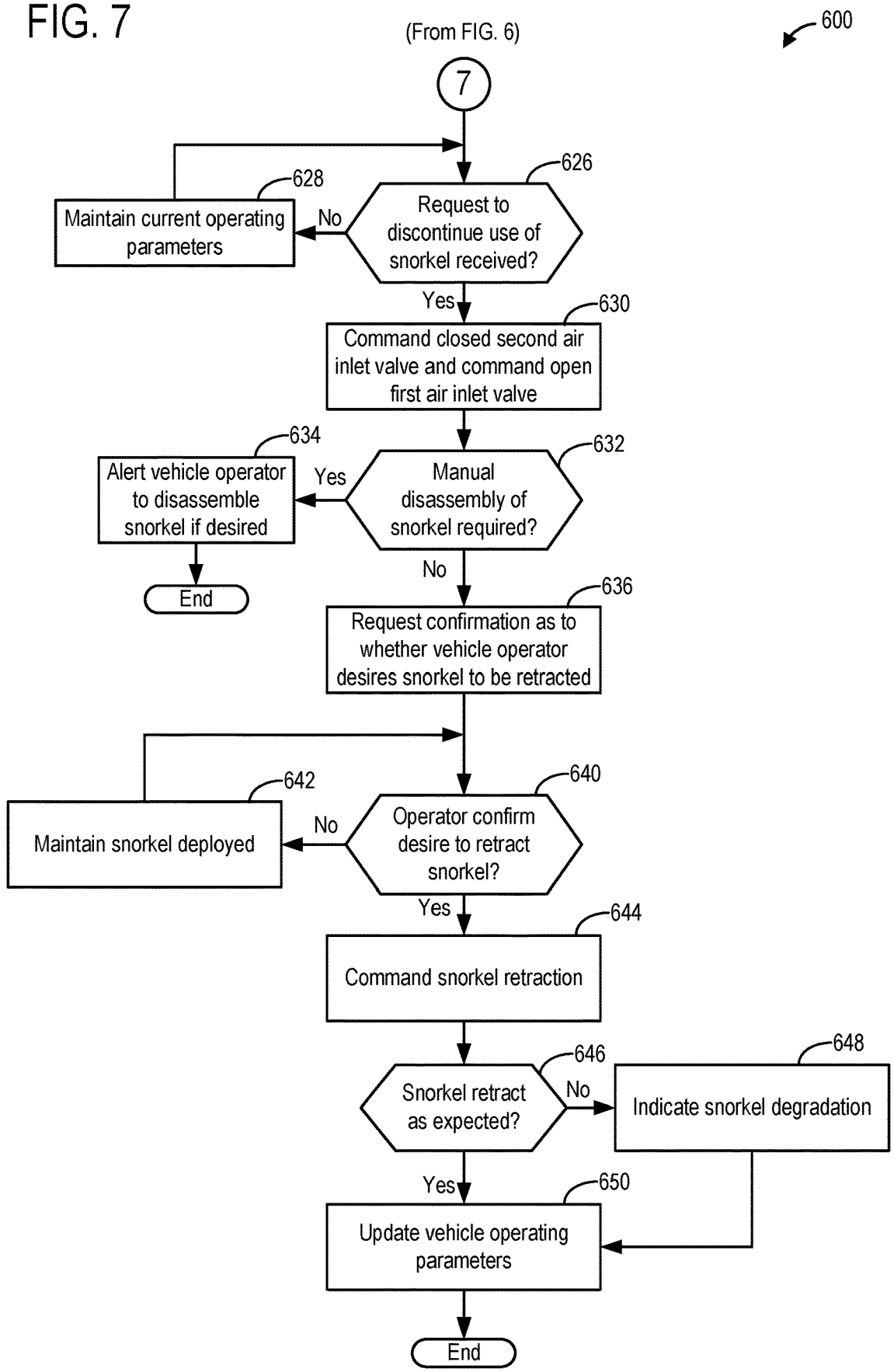
Figure 8:
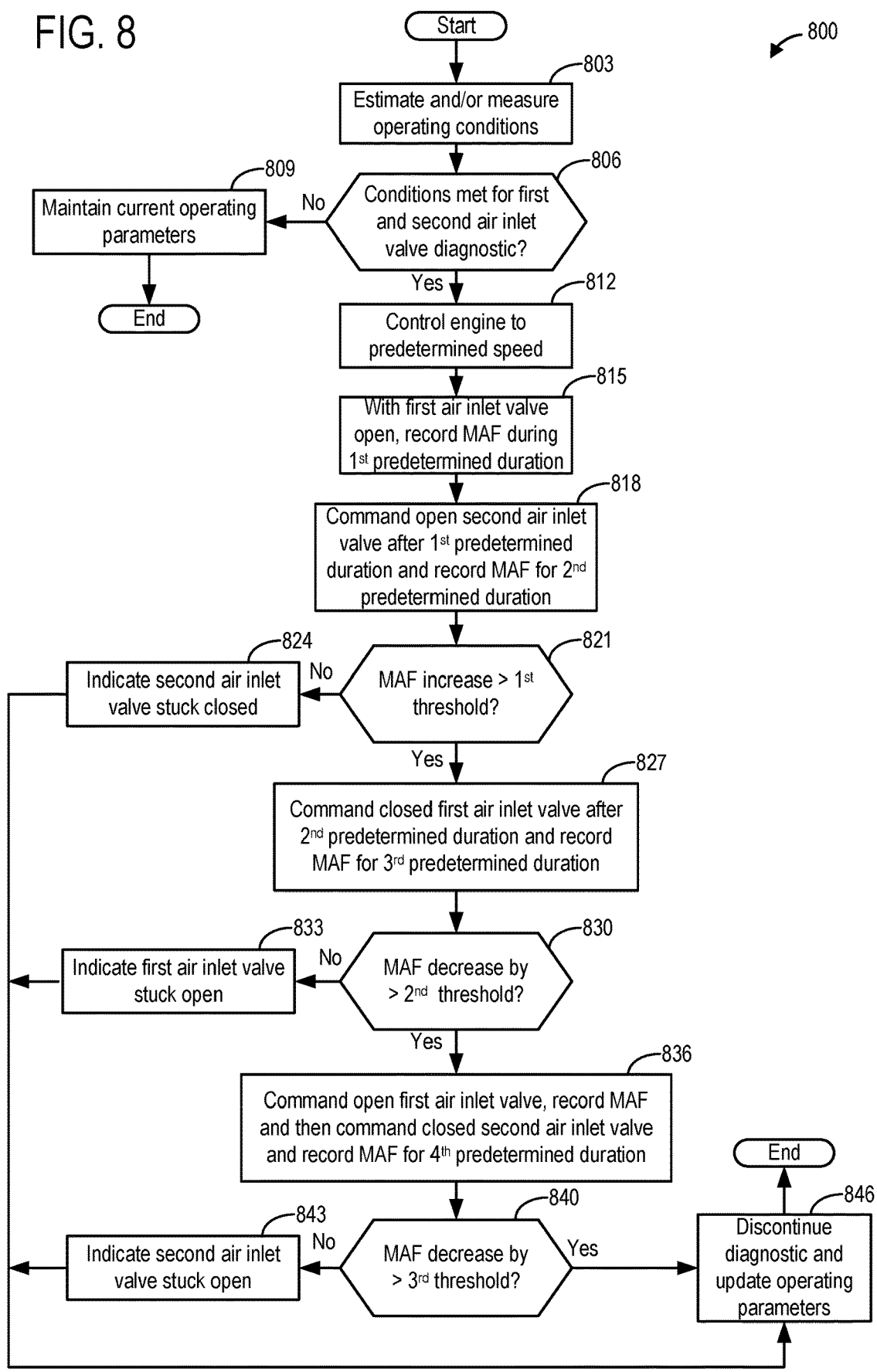
FIG. 8 depicts an example diagnostic method for determining whether valves that control whether air is inducted to the engine via the primary air induction pathway or the secondary air induction pathway, are functioning as desired or expected.
Figure 9:
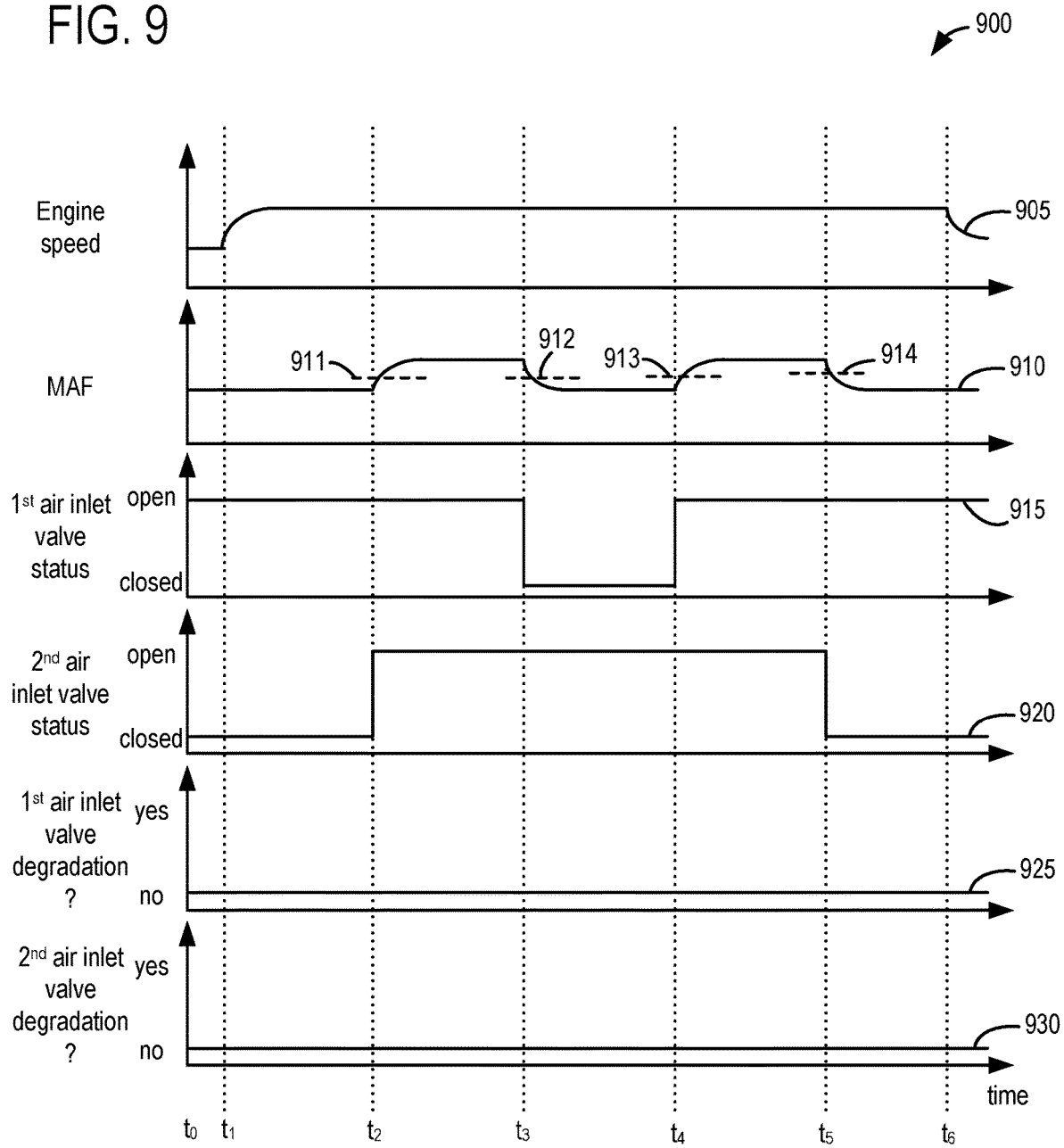
FIG. 9 depicts a prophetic example timeline illustrating how the method of FIG. 8 is conducted.
Figure 10:
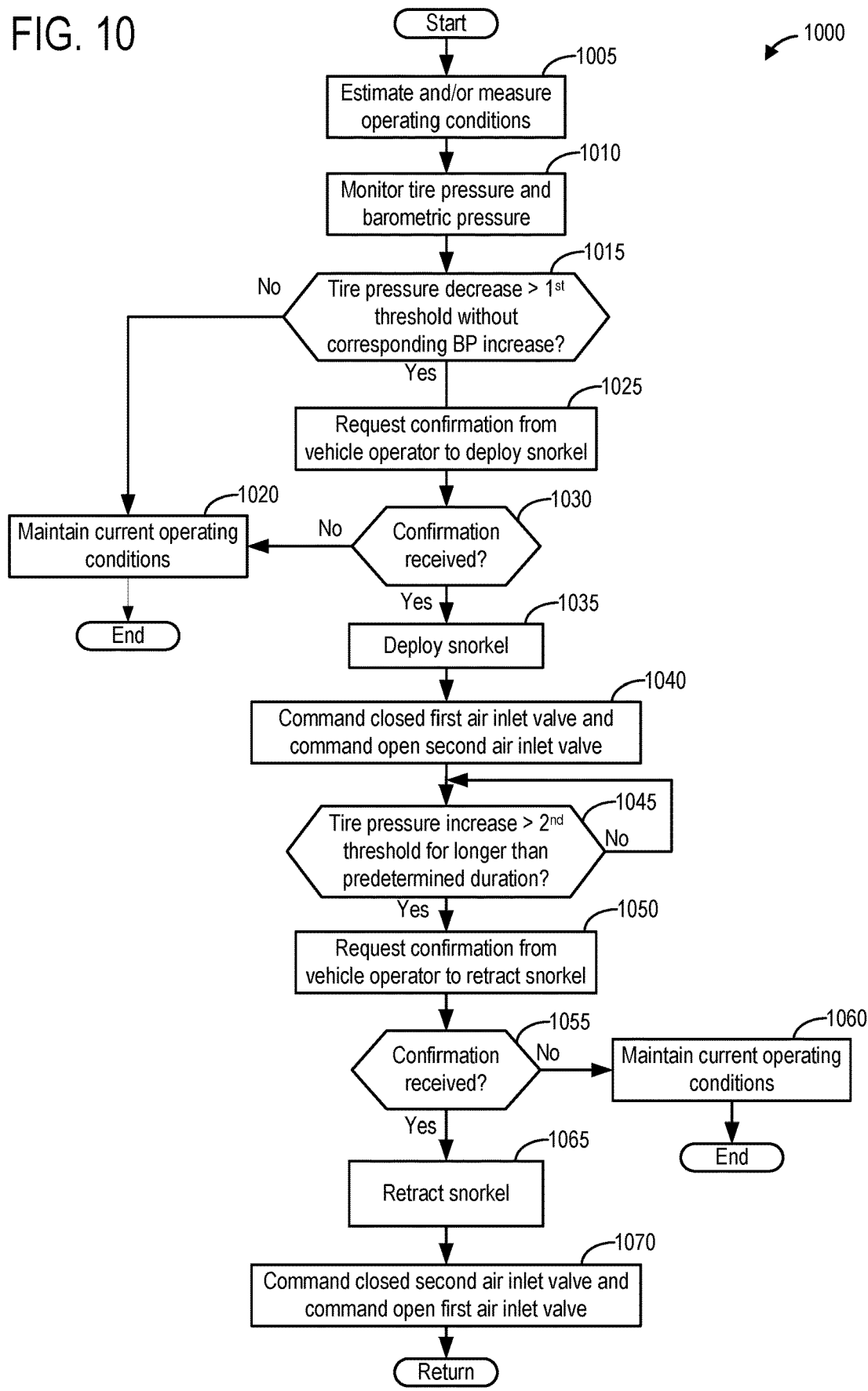
FIG. 10 depicts a high-level example method for detecting conditions where it may be desirable to deploy a snorkel system of the present disclosure.
Figure 11:
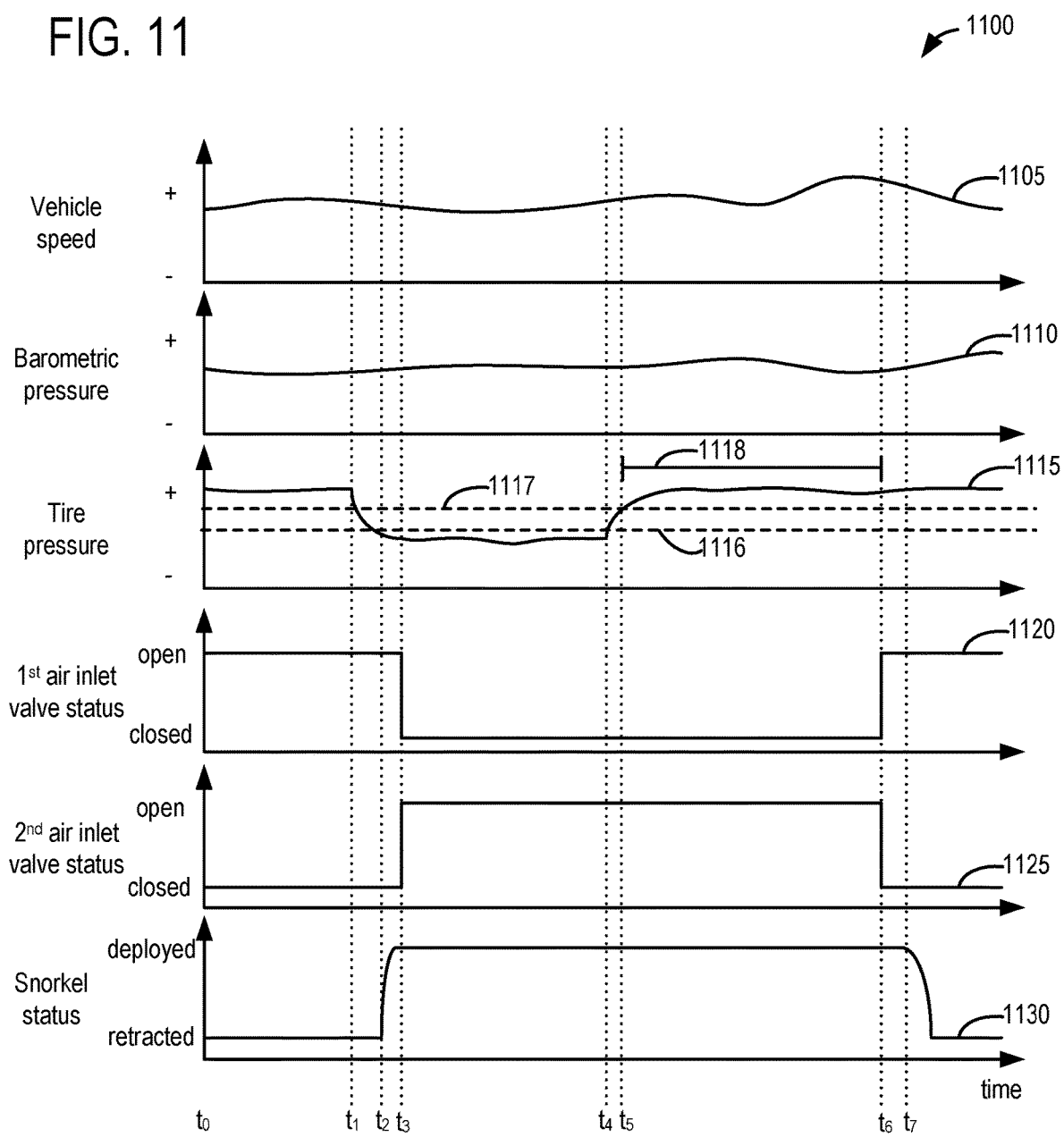
FIG. 11 depicts a prophetic example timeline illustrating how the method of FIG. 10 is conducted.

As discussed, control over the pathway in which air is inducted to the engine may be exerted by the controller by controlling a state of the first air inlet valve and the second air inlet valve. Accordingly, FIGS. 6-7 depict a methodology for how such control is exerted, and how the snorkel systems of the present disclosure are deployed and retracted. It may be desirable to confirm that the first air inlet valve and the second air inlet valve are functioning as desired or expected, and if not, to take appropriate mitigating action. Accordingly, FIG. 8 depicts an example method for diagnosing the first and second air inlet valves of the present disclosure. FIG. 9 illustrates a prophetic example timeline for conducting the methodology of FIG. 8. An example of how the snorkel systems of the present disclosure may be automatically deployed when conditions are inferred by the controller as appropriate for doing so, is depicted at FIG. 10. FIG. 11 illustrates a prophetic example timeline for conducting the methodology of FIG. 10.

FIG. 1 depicts an example of a vehicle 5 including a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146 (which may be referred to herein as intake lines), collectively referred to herein as air intake system 147. In some examples, intake air passage 146 may be one of a plurality of passages of an intake manifold 90 of the engine 10, with each passage of the plurality of passages being coupled to a separate cylinder of the engine 10. Intake air passage 142 may be the most upstream intake air passage of the series of intake air passages shown in FIG. 1, and may include an airbox 92 at an inlet of the intake air passage 142.

The airbox 92 may be an empty chamber collecting air from outside the intake air passage 142 and feeding the air to the intake manifold 90. In one example, the airbox 92 may be formed from a composite material and may be positioned directly adjacent to and mounted to the intake manifold 90.

In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from the fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. The controller 12 receives signals from the various sensors of FIG. 1 and employs the various actuators of FIG. 1 to adjust engine operation based on the received signals and instructions stored on a memory of the controller. For example, adjusting an amount of intake air flowing to the cylinder 14 via intake passage 146 may include adjusting a position of the throttle 162 (e.g., an amount of rotation of the throttle plate 164) in order to increase or decrease airflow from the intake passage 144 to the intake passage 146.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

One or more tire pressure monitoring sensors (TPMS) may be coupled to one or more tires of wheels 55 in the vehicle. For example, FIG. 1 shows a tire pressure sensor 197 coupled to wheel 55 and configured to monitor a pressure in a tire (not shown) of wheel 55. As described in more detail below, tire pressure sensors can be used as an auxiliary source for determining whether the vehicle is driving through water and/or heavy rain. For example, a tire pressure decrease may indicate that the vehicle is driving through water, or heavy rain, the tire pressure decrease resulting from a cooling of the tire(s). In some examples, as described in more detail below, a tire pressure decrease in the absence of a barometric pressure change may indicate that the vehicle is driving through water or heavy rain.

Discussed herein, airbox 92 may receive intake air from one or more of first air inlet duct 181 and second air inlet duct 182. Induction of air into airbox 92 via first air inlet duct 181 may be regulated via first air inlet valve 183, and induction of air into airbox 92 via second air inlet duct 182 may be via second air inlet valve 184. While not explicitly illustrated at FIG. 1, but which will be elaborated in greater detail below, it may be understood that first air inlet duct 181 may be for primary air induction, while second air inlet duct 182 may be for secondary air induction. More specifically, secondary air induction via second air inlet duct 182 may refer to air that is routed to airbox 92 by way of a snorkel (not shown at FIG. 1) that receives air from a position that is greater in height with respect to a vertical axis of the vehicle than air that is routed to airbox 92 by way of first air inlet duct 181. For example, the snorkel may enable secondary air induction via second air inlet duct 182 under conditions where first air inlet duct 181 is submerged in water or other fluid, or where there is a high likelihood that water, mud, or other particulate matter may be ingested into the engine via first air inlet duct 181.

Vehicle 5 may include a vehicle instrument panel 187, which an operator of the vehicle may interact with. Instrument panel 187 may be included, for example at the vehicle dash, and may comprise a human machine interface (HMI). In one example, the operator may interact with an air intake control selector 188, such that the operator may control a state of one or more of first air inlet valve 183 and second air inlet valve 184. For example, as will be elaborated in further detail below, the vehicle operator may select the first air inlet valve 183 to be fully closed and the second air inlet valve 184 to be fully open during conditions where the vehicle is water fording (or other conditions where there is a high likelihood of ingestion of water or other debris into the engine via the first air inlet duct 181). Under other operating conditions where the vehicle is not water fording (or other conditions where there is not a high risk of ingestion of water, mud, particulate matter, etc.), the vehicle operator may select the first air inlet valve 183 to be commanded fully open and the second air inlet valve 184 to be fully closed. In an alternative example such control over first air inlet valve 183 and second air inlet valve 184 may be automatically controlled via the controller, as will be discussed in greater detail below.

In some examples, the vehicle 5 may include a dedicated barometric pressure sensor 189, which may be configured to monitor barometric pressure.

Turning now to FIG. 2, depicted is a perspective view 200 of a portion of vehicle 5. Perspective view 200 shows the portion of vehicle 5 from a top-down perspective, where "top" refers to roof 201 of vehicle 5 and "down" refers to wheels 55. Vehicle 55 is shown without a hood, to illustrate a position of airbox 92 which as discussed supplies air to the engine (e.g., engine 10 at FIG. 1) via air intake system 147. Vehicle 5 includes a front 205 and a rear 206, although rear 206 is not shown in detail. First air intake duct 181 is shown extending from airbox 92 toward front 205 of vehicle 5, whereas second air intake duct 182 is shown extending from airbox 92 in the general direction of rear 206 of vehicle 5. Accordingly, first air intake duct 181 may be configured for primary air induction 210 into air intake system 147, while second air intake duct 182 may be configured for secondary air induction 212 into air intake system 147. It may be understood that primary air induction 210 may refer to the induction of air to air intake system 147 by way of front 205 of vehicle 5, for example air passing through a grille (not shown) associated with front 205 of vehicle 5. Alternatively, it may be understood that secondary air induction 212 may refer to the induction of air to air intake system 147 by way of a snorkel, which will be elaborated in further detail below. Briefly, it may be understood that the snorkel may act as an extension of air intake system 147 in a manner that elevates air intake from a usual position (e.g., under hood) to a more elevated position (e.g., elevated position on the vehicle hood, A-pillar, roof, or other elevated portion of the vehicle).

First air intake duct 181 is depicted as including first air inlet valve 183, and second air intake duct 182 is depicted as including second air inlet valve 184. Each of first air inlet valve 183 and second air inlet valve 184 may be controlled by way of the controller (e.g., controller 12 at FIG. 1). When first air inlet valve 183 is fully open and second air inlet valve 184 is fully closed, it may be understood that air may be inducted to airbox 92 and air intake system 147 via primary air induction 210. Alternatively, it may be understood that when second air inlet valve 184 is fully open and first air inlet valve 183 is fully closed, air may be inducted to airbox 92 and air intake system 147 via secondary air induction 212. It may be further understood that in some examples both first air inlet valve 183 and second air inlet valve 184 may both be fully open, without departing from the scope of this disclosure. By selectively controlling a state of each of first air inlet valve 183 and second air inlet valve 184, the manner in which air is inducted into air intake system 147 may be selectively controlled, which may be advantageous in that secondary air induction 212 may be utilized (and primary air induction 210 prevented) during conditions where vehicle 5 is water fording or engaging in some other activity in which induction of air via primary air induction 210 may potentially and undesirably result in the ingestion of water or other material (e.g., mud, dust, sand, etc.) into the engine by way of air intake system 147. Alternatively, when vehicle 5 is being operated under circumstances where there is not a high probability of water or other undesirable material being inducted to the engine via primary air induction 210, then secondary air induction 212 may be prevented, and primary air induction 210 may instead be used. As discussed herein, air induction via primary air induction may be referred to as air induction via a primary air induction pathway. Air induction via secondary air induction may be referred to as air induction via a secondary air induction pathway. Furthermore, as discussed herein, the snorkel may be one of manually deployable or automatically deployable. Thus, as will be further elaborated below, when not deployed, the snorkel may not be viewable at all from a position external the vehicle, which may be desirable to vehicle operators for aesthetic reasons when the vehicle is not being used for water fording or other off-roading activity.

Furthermore, it may be understood that first air inlet valve 183 may, when closed, form a watertight seal that does not allow water to enter into airbox 92 and air intake system 147. Along similar lines, airbox 92 may be sealed in a manner so as to prevent water from penetrating airbox 92 under conditions where vehicle 5 is traveling through water.

As mentioned, in some examples snorkel deployment may be manual. Accordingly, turning to FIGS. 3A-3B, depicted are examples of a first configuration 300 (FIG. 3A) of vehicle 5 where a snorkel is not manually deployed, and a second configuration 350 (FIG. 3B) where the snorkel has been manually deployed.

Beginning with FIG. 3A, vehicle 5 is depicted as having a front 205 and rear 206. Vehicle 5 is also described with respect to top 305 and bottom 306. It may be understood that with regard to FIGS. 3A-3B, the front-to-rear axis is horizontal whereas the bottom-to-top axis is vertical. Airbox 92 is illustratively depicted near front 205 of vehicle 5. While airbox 92 may include the first air inlet duct (e.g., first air inlet duct 181 at FIG. 1), the first air inlet duct is not depicted at FIG. 3A. However, second air inlet duct 182 is depicted as extending from airbox 92 in a general direction of rear 206 of vehicle 5. In this example embodiment, first air inlet duct 182 may be referred to as permanent snorkel body 182. Permanent snorkel body 182 may be sealingly engaged via first connector 310 to airbox 92 at a first end 311 of permanent snorkel body 182, and sealingly engaged via second connector 313 at a second end 312 of permanent snorkel body 182. Second connector 313 may be positioned towards rear 206 of vehicle 5, and may be mechanically coupled to third connector 314. Together second connector 313 and third connector 314 may be a dual female connector piece 315.

More specifically, dual female connector piece 315 may be positioned under a hood 316 of vehicle 5 and may be accessible via access door or panel 317. In some examples, access door 317 may be a powered access door, which may be commanded open via a vehicle operator via the vehicle operator interacting with a switch, button, HMI, etc., in the cabin of the vehicle. In other examples, the access door may be opened via a key, or may simply be depressed such that the pressure of depression results in the door opening (and where the access door can be closed in similar fashion). In still other examples, access door 317 may be a removable panel. Access door 317 may be positioned on a side 318 of vehicle 5, on hood 316 of vehicle 5, fender 330, cowl 319, etc.

FIG. 3A depicts vehicle 5 in a configuration where removable snorkel body 320 is not connected to third connector 314. Specifically, as will be elaborated in greater detail below, removable snorkel body 320 may include a first end 321 and a second end 322. First end 321 may be manually connected (e.g., ¼ turn attachment fitting, mechanical fastener attachment, etc.) to third connector 314, to fluidically couple removable snorkel body 320 to permanent snorkel body 182, and in turn, to airbox 92. Removable snorkel body 320 may receive air that is routed to air box 92 from second end 322. Removable snorkel body 320 may be secured, for example to A-frame 323 of vehicle 5, via mechanical fasteners 324. When first end 321 of removable snorkel body 320 is not mechanically coupled to third connector 314, a permanent snorkel body cap 325 may be used to seal off permanent snorkel body 182 from atmosphere. However, even in the absence of cap 325, it may be understood that with second air inlet valve 184 commanded closed, air may not be drawn into airbox 92 by way of permanent snorkel body 182 during engine operation.

Removable snorkel body 320, when not being used, may in some examples be stored in a predetermined and secure (to prevent rattling) location in a trunk (not shown) of vehicle 5, for example in a similar location as a spare tire. In other examples, where space constraints allow, removable snorkel body 320 may be stored in a predetermined and secure location under hood 316.

Turning to FIG. 3B, depicted is example illustration 350, showing removable snorkel body 320 mechanically coupled to third connector 314. Removable snorkel body 320 is further depicted as being secured to A-frame 323 via fasteners 324. It may be understood that fasteners 324 may be secured to A-frame 323 via threaded connectors, as an example. Fasteners 324 may be flexible, such that the vehicle operator may bend each of the fasteners in a manner that enables removable snorkel body 320 to be inserted underneath fasteners 324, thereby securing removable snorkel body 320 to A-frame 323.

In some examples, removable snorkel body head 355 may be mechanically coupled to second end 322 of removable snorkel body 320. Removable snorkel body head 355 may have an opening (not shown) that faces towards front 205 of vehicle 5, such that air may be drawn into head 355 in a front-to-rear direction with respect to vehicle 5, exemplified by arrow 360. Air drawn into removable snorkel body head 355 may then be routed to airbox 92 by way of removable snorkel body 320 and permanent snorkel body 182, under conditions where second air inlet valve 184 is commanded open via the controller (e.g., controller 12 at FIG. 1), as illustrated by arrow 361. In some examples, removable snorkel body head 355 may include an air filter that may filter particulate and/or reduce moisture content of air drawn into airbox 92 by way of removable snorkel body 320. While not explicitly illustrated, it may be understood that when second air inlet valve 184 is commanded open and removable snorkel body 320 is mechanically coupled to permanent snorkel body 182, by closing first air inlet valve 183 (refer to FIGS. 1-2), air may be prevented from being drawn into airbox 92 by way of first air inlet duct 181 (refer to FIGS. 1-2), and instead the engine may draw in air by way of snorkel system 365.

For reference, at each of FIGS. 3A-3B, a direction of gravity is depicted by arrow 380.

While FIGS. 3A-3B depict manual attachment of the removable snorkel body to the vehicle, in other examples a snorkel body may be automatically deployable. Turning to FIG. 4, depicted is another example illustration 400, showing vehicle 5 with an automatically deployable snorkel body. Briefly, FIG. 4 depicts an example where the snorkel body is automatically deployable in a flip-up manner, where the snorkel body occupies a first position when not deployed, and a second position when deployed, as will be elaborated in greater detail below.

Accordingly, FIG. 4 depicts snorkel system 405. Snorkel system 405 includes a first snorkel body section 406 and a second snorkel body section 407. First snorkel body section 406 may be understood to be fixed underneath a hood (not shown at FIG. 4 for clarity) of vehicle 5. It may be understood that first snorkel body section 406 may be the same or similar to the second air inlet duct (e.g., second air inlet duct 182 at FIG. 1), and may include second air inlet valve 184. A first end 410 of first snorkel body section 406 may be mechanically coupled via first connector 411 to airbox 92 in a similar manner as that discussed above with regard to FIG. 3A. First snorkel body section 406 may be coupled to second snorkel body section 407 via flexible portion 408. Flexible portion 408 may be understood to enable relative movement of second snorkel body section 407 with respect to first snorkel body section 406. Specifically, as discussed above, vehicle 5 may have a front 205 and a rear 206. Vehicle 5 may also have a first side 415 and a second side 416. First snorkel body section 406 may extend generally in a front-to-back direction, exemplified by arrow 418, whereas second snorkel body section 407 may, when in the first position, extend generally in a side-to-side direction, exemplified by arrow 419. Second snorkel body section 407 is depicted by a solid line when in the first position, and is depicted by a dashed line when in the second position. A rotation mechanism 420 may include, for example, one or more of a motor, gearing, electronics, etc., under control of the controller, which enables second snorkel body section 407 to be automatically deployed from the first position to the second position. The rotation mechanism may be referred to herein as a snorkel deployment system. It may be understood that the first position may be a position underneath the hood of vehicle 5. There may be a powered access door 422 which may open when commanded to do so, to enable second snorkel body section 407 to be actuated or deployed from the first position to the second position. In one example, powered access door 422 may flip up towards front 205 of vehicle 5 as exemplified by arrow 424 to expose second snorkel body section 407. In another example, powered access door 422 may flip up towards rear 206 of vehicle 5 as exemplified by arrow 426 to expose second snorkel body section 407. Once exposed it may be understood that second snorkel body section 407 may not be prevented from moving from the first position to the second position when commanded to do so.

As depicted at FIG. 4, when in the second position (refer to second snorkel body section 407 exemplified as the dashed line), second snorkel body section 407 may extend in an at least somewhat vertical direction, or in other words, in a direction from closer to bottom 306 to closer to top 305 of vehicle 5. As an illustrative example, when in the second position, second snorkel body section 407 may extend along A-frame 323 of vehicle 5, in similar nature as that discussed above with regard to FIGS. 3A-3B.

As second snorkel body section 407 rotates from the first position to the second, deployed position (exemplified by arrow 430), second snorkel body section 407 may encounter fasteners 435. Fasteners 435 may be configured to bend or flex as second snorkel body section 407 interacts with fasteners 435, such that second snorkel body section 407 may be secured underneath fasteners 435 when second snorkel body section 407 is in the second position. For example, second snorkel body section 407 may have one or more grooves (not shown) or depressions that align with the one or more bumps associated with fasteners 435. The number of grooves may correspond to the number of bumps of the fasteners (e.g., each fastener may have a single bump), such that the force of rotating the second snorkel body section 407 displaces the bumps of the fasteners until they engage with the grooves of second snorkel body section 407. In such an example, when rotation mechanism 420 is commanded to control second snorkel body section 407 from the second position back to the first position, the force of rotation may overcome another force that is holding the fasteners to the second snorkel body section, such that second snorkel body section 407 may be released from fasteners 435 without vehicle operator intervention. After snorkel body section 407 has been returned to the first position, powered access door 422 may close.

Similar to that discussed above at FIG. 3B, in some examples a snorkel body head 440 (e.g., similar or the same as head 355 at FIG. 3B) may be manually attached to an air intake end 441 of second snorkel body section 407, when second snorkel body section 407 is in the second or deployed position. As discussed above, the snorkel body head may mechanically couple to the air intake end 441 of second snorkel body section 407, and may have an opening 445 that opens towards front 205 of vehicle 5, for receiving air that is then routed via snorkel system 405 to airbox 92 and then to the engine by way of air intake system 147 under conditions where second air inlet valve 184 is commanded open. While not explicitly illustrated at FIG. 4, it may be understood that airbox 92 may additionally include the first air intake duct (e.g., first air inlet duct 181 at FIG. 1) that includes the first air inlet valve (e.g., first air intake valve 183 at FIG. 1). By closing the first air inlet valve and opening second air inlet valve when second snorkel body section 407 is in the second position, air may be prevented from entering the engine by way of the first air inlet duct, and instead may be routed to the engine by way of snorkel system 405.

While FIG. 4 depicted a "flip-up" mechanism for snorkel deployment, there may be other embodiments for deploying an automatically deployable snorkel according to the present disclosure. Such additional embodiments will be discussed below with regard to FIGS. 5A-5C.

Turning to FIG. 5A, depicted is example illustration 500, showing vehicle 5 with a first snorkel body section 505 that is mechanically coupled to airbox 92 via first connector 506 at a first end 507 of first snorkel body section 505. First snorkel body section 505 may include second air inlet valve 184. Thus, it may be understood that first snorkel body section 505 may be similar or the same as the second air inlet duct (e.g., second air inlet duct 182 at FIG. 1) discussed above. First snorkel body section 505 may be positioned underneath hood 316, and may be mechanically coupled to second snorkel body section 510 at a second end 511 via a second connector 512. A third snorkel body section 514 may fit within second snorkel body section 510, such that when retracted to a first position, second and third snorkel body sections are of a first length 516, but are of a second length 518 when deployed to a second position (as illustrated at FIG. 5A). An access door 520 may, when open, allow for third snorkel body section 514 to protrude upward in a vertical direction towards top 305 of vehicle 5. Access door 520 may be a powered access door that can open and close in response to commands from the vehicle controller. In other examples the access door may additionally or alternatively be opened manually via one or more of a key or force-actuated mechanical component. In one example, the access door may open or flip up towards rear 206 of vehicle 5 as depicted by dashed box 522, and as illustrated by arrow 524. Alternatively, access door may open towards front 205 of vehicle 5, exemplified by arrow 526.

Deploying and retracting of third snorkel body section 514 may be under control of electronic elongation apparatus 530, which may also be referred to herein as a snorkel deployment system. Electronic elongation apparatus may receive input from the vehicle controller (e.g., controller 12 at FIG. 1), and may include one or more of a motor, gearing, and electronics to enable electronic elongation apparatus 530 to deploy third snorkel body section in response to requests from the vehicle controller. Similar to that discussed above, snorkel head 531 may in some examples be able to be manually attached to third snorkel body section 514 as shown, and may include an air opening (not shown) that enables air to enter into third snorkel body section 514 via snorkel head 531 in the direction represented by arrow 535. However, in other examples it may be understood that snorkel system 536 may be used without manually attaching snorkel head 531 to third snorkel body section 514, without departing from the scope of this disclosure.

In some examples, the second height 518 may be controllable. For example, via an input device (e.g., HMI at the vehicle dash, smartphone running a software application, etc.) may be accessed via an operator of the vehicle and parameters regarding second height 518 may be selectable, such that the controller may control the second height based on input from the vehicle operator. However, in other examples second height 518 may not be controllable as a function of operator input, without departing from the scope of this disclosure.

Thus, FIG. 5A depicts an example where third snorkel body section 514 deploys extends upwards in a substantially vertical direction from second snorkel body section 510, as illustrated by arrow 540. It may be understood that the substantially vertical direction in this example refers to extension of third snorkel body 514 in a bottom-to-top direction (refer to arrow 540), where the vehicle has bottom 306 and top 305. In other words, third snorkel body 514 does not, when deployed, extend along a front-to-back axis (refer to arrow 542), but rather deploys straight upward in the direction of top 305 of vehicle 5.

Alternatively, turning to FIG. 5B, example illustration 550 depicts a situation where third snorkel body 514 deploys to the second position at an angle. Example illustration thus depicts snorkel system 552. Components of FIG. 5B that are the same as those discussed at FIG. 5A are depicted by like numerals, and exhaustive description of each component is not reiterated here for brevity. Depicted at FIG. 5B is arrow 542, representing the front-to-back axis of vehicle 5, and arrow 540, representing the bottom-to-top axis, similar to that described above with regard to FIG. 5A. Line 514a is used to represent third snorkel body section 514, to illustrate that the angle 551 (A) at which the third snorkel body section 514 deploys is with respect to the vertical, or bottom-to-top axis such that third snorkel body extends upwards toward top 305 and backwards towards rear 206 of vehicle 5. Other aspects of example illustration 550 are similar to those previously discussed at FIG. 5A, and thus will not be reiterated here for brevity. However, it may be further understood that in order to enable third snorkel body section 514 to deploy at the angle discussed, second snorkel body 510 may too be positioned at a similar angle.

Turning to FIG. 5C, another example illustration 570 depicts a situation where third snorkel body section 514 is made up of two or more individual units, such that deployment and retraction of third snorkel body 514 occurs in a telescoping fashion. Illustration 570 thus depicts snorkel system 571. Components of FIG. 5C that are the same as those depicted at FIGS. 5A-5B are represented by like numerals, and exhaustive description of each component is not reiterated at FIG. 5C for brevity. At FIG. 5C, third snorkel body section 514 is made up of three units including first unit 514b, second unit 514c, and third unit 514d, however, in other examples, more or less units may be used for third snorkel body section 514 without departing from the scope of this disclosure. It may be understood that a diameter of third unit 514d may be less than a diameter of second unit 514c, which in turn may be less than a diameter of first unit 514b. First unit 514b may have a diameter that is less than a diameter of second snorkel body 510, such that when retracted, third snorkel body section 514 and second snorkel body section 510 are of a total first length 516, but when deployed are of a total second length 518, similar to that discussed above with regard to FIGS. 5A-5B.

While not explicitly illustrated at FIGS. 5A-5C, it may be understood that there may be a first air inlet duct (e.g., first air inlet duct 181 at FIG. 1), that includes the first air inlet valve (e.g., first air inlet valve 183) extending from airbox 92 in a direction of front 205 of vehicle 5. Furthermore, for reference a direction of gravity for each of FIGS. 5A-5C is depicted by arrow 380.

FIG. 5D depicts an example illustration 590 showing a more detailed view of a snorkel head 591 (e.g., snorkel head 335 at FIG. 2, snorkel head 440 at FIG. 4, snorkel head 531 at FIGS. 5A-5C) that may be used with the various embodiments of the present disclosure. Snorkel head 591 may include a face 596 that includes an opening to allow air to flow into head 591. In some examples, filter 595 may be included as part of snorkel head 591 such that incoming air into snorkel head 591 may be filtered to remove dust or other particulate matter and/or to reduce a moisture content of incoming air. Snorkel head 591 may fit over a snorkel body 592 (e.g., removable snorkel body 320 at FIGS. 3A-3B, second snorkel body section 407 at FIG. 4, etc.), such that air entering into snorkel body 592 flows through snorkel head 591 before entering snorkel body 592. Stoppers 594 may extend from inner side walls of snorkel head 591, and may interact with snorkel body 592 as depicted to optimally position snorkel head 591 on snorkel body 592. Threaded fasteners 593 may be used to secure snorkel head 591 to snorkel body 592 in some examples. In other examples, a hose clamp or other attachment device may be used to secure snorkel head 591 to snorkel body 592. For example, a vehicle operator may manually assemble snorkel head 591 on snorkel body 592 as shown, by aligning threaded fasteners 593 with threaded holes (not shown) on snorkel body 592, and turning threaded fasteners 593 in a manner to securely mechanically couple snorkel head 591 to snorkel body 592.

Discussed herein, a system for a vehicle may comprise a primary air induction pathway for providing an airflow to an engine of the vehicle, the primary air induction pathway including a first air inlet valve. Such a system may further include a deployable snorkel associated with a snorkel system for providing air to an engine of the vehicle via the snorkel system, the snorkel system including a second air inlet valve. Such a system may further include a controller with computer readable instructions stored on non-transitory memory that when executed, cause the controller to command the first air inlet valve open and the second air inlet valve closed to route air to the engine via the primary air induction pathway, receive a request to deploy the snorkel, indicate that the snorkel is deployed, and command the second air inlet valve open and then command the first air inlet valve closed to supply the engine with the airflow via the snorkel system and not the primary air induction pathway.

For such a system, the system may further comprise a snorkel deployment system and a powered access door of the vehicle. In such an example, the controller may store further instructions to, in response to receiving the request to deploy the snorkel, command open the powered access door and command the snorkel deployment system to deploy the snorkel from a first, retracted position to a second, deployed position.

For such a system, the system may further comprise an access panel for accessing a permanent snorkel body section of the snorkel system, and wherein the snorkel is a removable snorkel that is deployed by manually coupling the removable snorkel to the permanent snorkel body section of the snorkel system. In such an example, the controller may store further instructions to receive the indication that the snorkel is deployed by way of a vehicle operator submitting a confirmation via a human machine interface in a cabin of the vehicle that the removable snorkel has been manually coupled to the permanent snorkel body section.

For such a system, the system may further comprise tire pressure sensors coupled to tires of the vehicle, and a barometric pressure sensor. In such an example, the controller may store further instructions to receive the request to deploy the snorkel in response to an indication of a tire pressure decrease by greater than a predetermined threshold decrease without a corresponding increase in barometric pressure, the tire pressure decrease monitored by the tire pressure sensors and the barometric pressure monitored via the barometric pressure sensor.

For such a system, the system may further comprise a mass air flow sensor positioned in an air intake system of the engine. The controller may store further instructions to receive a request to conduct a diagnostic to infer whether the first air inlet valve and the second air inlet valve are functioning as desired or expected. In response to conditions being met for conducting the diagnostic, the instructions may include conducting the diagnostic by manipulating an open state and a closed state of each of the first air inlet valve and the second air inlet valve in a predetermined order while monitoring the airflow to the engine via the mass air flow sensor. The controller may store further instructions to indicate degradation of one of the first air inlet valve or the second air inlet valve based on a deviation in the mass air flow from an expected mass air flow as a function of the predetermined order in which the first air inlet valve and the second air inlet valve are each controlled to the open state and the closed state.

Turning now to FIG. 6, depicted is a high-level example method 600 for controlling a manner in which air is inducted into an engine by way of an airbox and an air intake system. More specifically, method 600 may be used to selectively control whether air is inducted to the engine by way of a first air intake duct (e.g., first air intake duct 181 at FIG. 2), or by way of a second air intake duct (e.g., second air intake duct 182 at FIG. 2). Method 600 will be described with reference to the systems described herein and shown in FIGS. 1-5D, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such as a powered access door (e.g., powered access door 422 at FIG. 4, or powered access door 520 at FIGS. 5A-5C), snorkel body rotation mechanism (e.g., rotation mechanism 420 at FIG. 4), snorkel body elongation apparatus (e.g., elongation apparatus 530 at FIGS. 5A-5C), a first air inlet valve (e.g., first air inlet valve 183 at FIG. 1), a second air inlet valve (e.g., second air inlet valve 184 at FIG. 1), etc., to alter states of devices in the physical world according to the methods depicted below.

Method 600 begins at 602, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 604, method 600 includes indicating whether a snorkel system associated with the vehicle (e.g., snorkel system 365 at FIG. 3B, snorkel system 405 at FIG. 4, snorkel system 536 at FIG. 5A, snorkel system 552 at FIG. 5B, snorkel system 571 at FIG. 5C) is currently being used. If so, method 600 proceeds to FIG. 7, where method 600 is continued and which will be discussed further below. If not, method 600 proceeds to 606.

At 606, method 600 includes indicating whether a request to use the snorkel system has been received at the controller of the vehicle. As an example, a vehicle operator may use a HMI at the vehicle dash to request usage of the snorkel system, and the request may be communicated to the controller. In another example, the vehicle operator may request usage of the snorkel system by interacting with a software application on a smartphone of the vehicle operator, a laptop of the vehicle operator, or other computing device (e.g., tablet) running the software application that sends input requests to the vehicle controller. In another example, the vehicle operator may use a dedicated switch, button, lever, etc., located in a cabin of the vehicle to communicate to the controller the request to use the snorkel system. The dedicated switch, button, lever, etc., may in some examples be located on a steering wheel of the vehicle.

If, at 606, such a request is not received at the controller, method 600 proceeds to 608. At 608, method 600 includes maintaining current vehicle operating parameters. For example, the controller may maintain open the first air inlet valve (e.g., first air inlet valve 183 at FIG. 1), and maintain closed the second air inlet valve (e.g., second air inlet valve 184 at FIG. 1), such that primary air induction is relied upon for supplying air to the engine, as opposed to secondary air induction (e.g., air induction via the snorkel system). Method 600 may then continue to monitor as to whether a request to use the snorkel system is received at the controller.

If, at 606, the request to use the snorkel system has been received, method 600 proceeds to 610. At 610, method 600 includes indicating whether the particular snorkel system associated with the vehicle has to be assembled, at least somewhat, manually. In other words, at 610, method 600 determines whether the vehicle includes a snorkel system such as that depicted at FIGS. 3A-3B. If not, method 600 determines that the snorkel system associated with the vehicle may be automatically deployed. In other words, method 600 determines that the snorkel system is one of a snorkel system such as that depicted at FIGS. 4-5C. Method 600 then proceeds to 612.

At 612, method 600 includes deploying a snorkel associated with the snorkel system of the vehicle. As an example, if the snorkel system is a snorkel system such as that depicted at FIG. 4, method 600 may include commanding the rotation mechanism (e.g., rotation mechanism 420 at FIG. 4) to deploy a deployable snorkel body section (e.g., second snorkel body section 407 at FIG. 4) to its deployed position. As another example, if the snorkel system is a snorkel system such as that depicted at one of FIGS. 5A-5C, then method 600 may include commanding the electronic elongation apparatus (e.g., electronic elongation apparatus 530 at FIGS. 5A-5C) to deploy a deployable snorkel body section (e.g., third snorkel body section 514 at FIGS. 5A-5C) to its deployed position. Deploying the snorkel may further include sending a signal to an actuator of a powered access door (e.g., powered access door 422 at FIG. 4, or powered access door 520 at FIGS. 5A-5C), to actuate open the powered access door in order to enable the deployable snorkel body section to deploy from its initial, non-deployed position, to its final, deployed position.

Responsive to deploying the snorkel, method 600 proceeds to 614. At 614, method 600 includes indicating whether the snorkel deployed as expected or desired. For example, if the controller receives an indication that the powered access door did not open as expected or desired, then it may be inferred that the snorkel did not deploy as expected or desired. In another example, if the controller receives indication of a fault associated with a motor of, for example, the rotation mechanism or the electronic elongation apparatus, then it may be inferred that the snorkel did not deploy as expected or desired. In other words, at 614, method 600 may include indicating whether there is degradation associated with the vehicle snorkel system.

Thus, if at 614 it is indicated that the snorkel did not deploy as expected or desired, method 600 proceeds to 616. At 616, method 600 includes indicating the presence of degradation associated with the vehicle snorkel system. Indicating the presence of snorkel system degradation may include setting a flag at the vehicle controller. A malfunction indicator light (MIL) may be illuminated at the vehicle dash, to alert the vehicle operator of the snorkel system degradation. The MIL may indicate to the vehicle operator that it is not recommended to use the vehicle in situations where water or other material may be ingested into the engine by way of the primary air induction pathway, due to the snorkel system being unavailable for use. Additionally or alternatively, the controller may communicate such information to the vehicle operator via a message through the vehicle HMI, an audible message communicated via the vehicle sound system, etc.

Proceeding to 618, method 600 includes maintaining open the first air inlet valve (e.g., first air inlet valve 183 at FIG. 1), and maintaining closed the second air inlet valve (e.g., second air inlet valve 184 at FIG. 1). Method 600 may then end.

Returning to 610, if, rather than the snorkel system associated with the vehicle being automatically deployable, the snorkel system has to be at least partially manually assembled (e.g., snorkel system 365 at FIGS. 3A-3B), then method 600 proceeds to 620. At 620, method 600 includes indicating whether manual assembly has been confirmed. Specifically, it may be understood that the vehicle controller may not know whether the manual assembly of the snorkel system has been carried out unless the vehicle operator communicates to the controller that the manual assembly process has been done. For example, the vehicle operator may input information to the HMI, or via a computing device (e.g., smartphone, laptop, etc.) running the software application mentioned above, that the manual assembly process has been effectively conducted. The input may be communicated to the controller.

Accordingly, if, at 620, method 600 indicates that manual assembly of the snorkel system has not yet been confirmed, method 600 proceeds to 622. At 622, method 600 includes maintaining open the first air inlet valve and maintaining closed the second air inlet valve until the controller receives the indication that manual assembly has been conducted. In a situation where the manual assembly process cannot be carried out due to some issue (e.g., degradation of one or more components associated with the snorkel system), then it may be understood that the vehicle may continue to rely on the primary air induction pathway for routing air to the engine, as opposed to the secondary air induction pathway.

Alternatively, once the confirmation at 620 is received by the controller, method 600 proceeds to 624. At 624, method 600 includes commanding closed the first air inlet valve and commanding open the second air inlet valve. With the first air inlet valve closed and the second air inlet valve open, it may be understood that air may be inducted to the engine via the secondary air induction pathway and not the primary air induction pathway. Method 600 then continues at FIG. 7.

Turning to FIG. 7, step 626 may follow either step 604 or step 624 described above at FIG. 6. At 626, method 600 includes indicating whether a request to discontinue use of the snorkel system has been received at the controller. Similar to that discussed above, the request may be communicated to the controller via the vehicle operator through the vehicle HMI, a computing device running the software application referred to above, etc. If such a request is not received, then method 600 proceeds to 628 where current operating parameters are maintained. Specifically, the first air inlet valve may be maintained closed and the second air inlet valve may be maintained open.

Alternatively, responsive to a request to discontinue usage of the snorkel system being received at the controller at 626, method 600 proceeds to 630. At 630, method 600 includes commanding closed the second air inlet valve and commanding open the first air inlet valve. Continuing to 632, method 600 includes indicating whether manual disassembly of the snorkel is required. If so, method 600 proceeds to 634, and includes alerting (e.g., via an HMI message, audible message, etc.) the vehicle operator to disassemble the snorkel if so desired. In some examples, the vehicle operator may not desire to disassemble the snorkel, for example in a situation where the vehicle operator knows that the snorkel system will be desired to be used again in the near future. In a situation where the vehicle operator does desire to disassemble the snorkel system, the vehicle operator may provide confirmation that the snorkel system has been effectively disassembled by inputting the confirmation to the controller via the HMI, computing device running the software supplication, etc. In another example, replacement of a cap (e.g., permanent snorkel body cap 325 at FIG. 3) may trigger a signal to be sent to the controller to indicate that the snorkel system has been manually disassembled. Method 600 may then end.

Alternatively, if manual disassembly of the snorkel system is not required (e.g., the snorkel system relies on automatic retraction of the snorkel), method 600 proceeds to 636. At 636, method 600 includes requesting confirmation from the vehicle operator as to whether the vehicle operator desires the snorkel to be retracted. For example, there may be circumstances where the vehicle operator knows that the snorkel system will be used in the near future, and it may be desirable to simply maintain the snorkel deployed until then. The request for confirmation may be communicated to the vehicle operator via the HMI, computing device running the software application, etc., as discussed above.

Proceeding to 640, if the vehicle operator does not confirm the desire to retract the snorkel, or instead inputs to the controller a desire to maintain the snorkel deployed, method 600 proceeds to 642. At 642, method 600 includes maintaining the snorkel deployed.

Alternatively, at 640, in response to the operator confirming the desire to retract the snorkel, method 600 proceeds to 644. At 644, method 600 includes commanding retraction of the snorkel to its initial configuration prior to being deployed, as discussed in detail above with regard to FIGS. 4-5C. At 646, method 600 includes indicating whether the snorkel retracted as expected or desired. For example, similar to that discussed above, a fault associated with a motor that controls snorkel retraction may prevent the snorkel from retracting as desired or expected. In such a case, method 600 proceeds to 648. At 648, method 600 includes indicating degradation associated with the snorkel system. For example, a flag may be set at the controller, and a MIL may be illuminated at the vehicle dash, to alert the vehicle operator of the degraded snorkel system. In some examples, additionally or alternatively, a text-based or audible message (e.g., via the HMI or computing device running the software application) may be used to call attention to the fact that the snorkel system is degraded, so the vehicle operator avoids situations where snorkel system usage is desired.

Whether the snorkel retracts as desired or expected, or if there is an inferred presence of snorkel system degradation, method 600 proceeds to 650. At 650, method 600 includes updating vehicle operating parameters. Updating vehicle operating parameters at 650 may include storing information pertaining to snorkel system usage, such as how long the snorkel system was used, parameters relating to how much intake air flow occurred during the snorkel system usage, etc. Fuel consumed during the usage of the snorkel system, etc. Such parameters may be used in some examples by the controller as data for potentially indicating whether there is some aspect of degradation associated with the snorkel system. Method 600 may then end.

It is herein recognized that it may be desirable to periodically determine whether the first air inlet valve (e.g., first air inlet valve 183 at FIG. 1) and the second air inlet valve (e.g., second air inlet valve 184 at FIG. 1) are functioning as desired or expected. For example, if usage of the vehicle snorkel system is requested, and the first air inlet valve is commanded closed and the second air inlet valve is commanded open, but does not effectively open, engine hesitation and/or stall may result. Similar logic applies to a situation where it is desired to discontinue usage of the snorkel system, but the first air inlet valve sticks closed.

Thus, discussed herein, a method for a vehicle may comprise automatically deploying a snorkel associated with a vehicle snorkel system in response to a first request to deploy the snorkel being received at a controller of the vehicle, and automatically retracting the snorkel in response to a second request to retract the snorkel being received at the controller.

For such a method, the method may further comprise routing an airflow to an engine of the vehicle via a primary air induction pathway and not via the snorkel system during conditions where the snorkel is retracted, and routing the airflow to the engine via the snorkel system and not via the primary air induction pathway during conditions where the snorkel is deployed.

For such a method, the method may further comprise commanding closed a first air inlet valve included in the primary air induction pathway and commanding open a second air inlet valve associated with the snorkel system to route the airflow to the engine via the snorkel system, and commanding closed the second air inlet valve and commanding open the first air inlet valve to route the airflow to the engine via the primary air induction pathway.

For such a method, the method may further comprise commanding open an access door of the vehicle to allow the snorkel to deploy from a first, retracted position to a second, deployed position responsive to the first request, and commanding closed the access door responsive to an indication that the snorkel has adopted the first, retracted position responsive to the second request.

For such a method, the method may further include wherein the first request and the second request include an input to the controller from a vehicle operator.

Turning to FIG. 8, an example high-level method 800 is shown, depicting methodology for determining whether the first air inlet valve and/or the second air inlet valve is/are functioning as desired or expected, or is/are exhibiting degraded function. Method 800 will be described with reference to the systems described herein and shown in FIGS. 1-5D, though it should be understood that similar methods may be applied to other systems without departing from the scope of this disclosure. Method 800 may be carried out by a controller, such as controller 12 in FIG. 1, and may be stored at the controller as executable instructions in non-transitory memory. Instructions for carrying out method 800 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such as a powered access door (e.g., powered access door 422 at FIG. 4, or powered access door 520 at FIGS. 5A-5C), snorkel body rotation mechanism (e.g., rotation mechanism 420 at FIG. 4), snorkel body elongation apparatus (e.g., elongation apparatus 530 at FIGS. 5A-5C), a first air inlet valve (e.g., first air inlet valve 183 at FIG. 1), a second air inlet valve (e.g., second air inlet valve 184 at FIG. 1), etc., to alter states of devices in the physical world according to the methods depicted below.

Method 800 begins at 803, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 806, method 800 includes indicating whether conditions are met for conducting a first and second air inlet valve diagnostic. Conditions being met may include a situation where the snorkel system of the vehicle is deployed. Additionally or alternatively, conditions being met may include a vehicle idle condition, where the vehicle is not in a situation where induction of air via the primary air induction pathway may result in ingestion of water or other fluid or particulate matter into the engine. For example, the controller may request confirmation (e.g., via the HMI, computing device running the software application, etc.) from the vehicle operator that the vehicle is in such a situation. For example, the controller may indicate to the driver that the diagnostic is requested, and may request confirmation that the vehicle is in a situation where the diagnostic may be conducted. Conditions for conducting the diagnostic may be indicated to be met responsive to the controller receiving such confirmation. Additionally or alternatively, conditions being met at 806 may include an indication that a predetermined duration of time has elapsed since the diagnostic was last conducted. Additionally or alternatively, conditions being met at 806 may include an indication of an absence of degradation associated with the MAF sensor (e.g., MAF sensor 122 at FIG. 1), throttle (e.g., throttle 162 at FIG. 1), air intake system (e.g., air intake system 147 at FIG. 1), etc.

If, at 806, conditions are not indicated to be met for conducting the first and second air inlet valve diagnostic, method 800 proceeds to 809. At 809, method 800 includes maintaining current operating parameters. Specifically, a current status of both the first air inlet valve and the second air inlet valve may be maintained without conducting the diagnostic routine of method 800. Method 800 may then end.

Returning to 806, responsive to conditions being indicated to be met for conducting the diagnostic, method 800 proceeds to 812. At 812, method 800 includes controlling the engine to a predetermined speed. The predetermined speed may be a speed that is determined to be associated with robust diagnostic results. In some examples, the predetermined speed may be an engine idle speed. In other examples, the predetermined speed may be greater than the engine idle speed. Engine speed may be controlled, for example, via the controller exerting control over a position of the throttle. For example, the throttle may be controlled to a predetermined position for conducting the diagnostic.

Proceeding to 815, method 800 includes, with the first air inlet valve open and the second air inlet valve closed, recording mass air flow (e.g., via the MAF sensor) during a first predetermined duration. After the first predetermined duration elapses, method 800 proceeds to 818. At 818, method 800 includes commanding open the second air inlet valve, and recording mass air flow for a second predetermined duration. It may be understood that at 818, method 800 includes maintaining open the first air inlet valve. Continuing to 821, method 800 includes indicating whether an increase in mass air flow resulting from commanding open the second air inlet valve is greater than a first threshold increase. If not, then method 800 proceeds to 824, where it is inferred that the second air inlet valve is stuck closed. In other words, because mass air flow did not increase by more than the threshold increase, it may be inferred that the second air inlet valve is stuck closed (or at least substantially closed) such that an expected amount of additional air is not being ingested into the engine as a result of commanding open the second air inlet valve while the first air inlet valve is open. Responsive to the indication, method 800 proceeds to 846. At 846, method 800 includes discontinuing the diagnostic and updating vehicle operating parameters. For example, updating vehicle operating parameters may include setting a flag at the controller indicating that the second air inlet valve is stuck closed. Updating vehicle operating parameters may further include setting a MIL at the vehicle dash and/or generating a text or audio message to communicate to the vehicle operator that is it inadvisable to attempt to use the snorkel system, and that it is requested to have the snorkel system serviced. Method 800 may then end.

Returning to 821, responsive to mass air flow increasing by more than the first threshold increase, method 800 proceeds to 827. At 827, method 800 includes commanding closed the first air inlet valve after the second predetermined time duration elapses, while maintaining open the second air inlet valve. With the first air inlet valve commanded closed, method 800 includes recording the mass air flow for a third predetermined duration. Continuing to 830, method 800 includes indicating whether the mass air flow decreased by greater than a second threshold decrease. In other words, at 830, method 800 judges whether mass air flow has decreased by an expected amount due to the commanding closed of first air inlet valve. If not, then method 800 proceeds to 833, where it is indicated that the first air inlet valve is stuck open. Method 800 then proceeds to 846, and includes discontinuing the diagnostic and updating vehicle operating parameters. For example, a flag may be set at the controller indicating that the first air inlet valve is stuck open. A MIL may be illuminated at the vehicle dash, and a text or audible message may be communicated to the vehicle operator that the first air inlet valve is stuck open, and that as a result, it is inadvisable to operate the vehicle in any circumstance where water or other fluid or particulate matter may be ingested into the engine via the primary air induction pathway. Method 800 may then end.

Alternatively, if at 830 it is indicated that the mass air flow decreased by the expected amount in response to the first air inlet valve being commanded closed, method 800 proceeds to 836. At 836, method 800 includes commanding open the first air inlet valve, recording mass air flow, and then commanding closed the second air inlet valve. However, it may be understood that there is a potential that the first air inlet valve could be sticking closed, such that the first air inlet valve does not open as expected when commanded to do so. In such an example, it may be understood that mass air flow may not increase as expected, and such an indication may be relied upon by the controller to infer that the first air inlet valve has become stuck closed. In such an example, while not explicitly illustrated, it may be understood that method 800 may proceed to 846, where operating conditions may be updated. For example, a flag may be set at the controller indicating degradation of the first air inlet valve, and a MIL may be illuminated at the vehicle dash to alert the vehicle operator of the stuck closed first air inlet valve. In some examples, a text-based or audible message may be communicated to the vehicle operator indicating the stuck closed state of the first air inlet valve. The controller may rely on the secondary air induction pathway for engine operation until mitigating action to address the sticking closed first air inlet valve has taken place. Method 800 may then end.

Returning to 836, responsive to a situation where mass air flow increased by the expected amount responsive to the first air inlet valve being commanded open, method 800 includes commanding closed the second air inlet valve as mentioned above. In response to the second air inlet valve being commanded closed, method 800 proceeds to 840. At 840, method 800 includes indicating whether mass air flow has decreased by more than a third threshold decrease. If not, then method 800 proceeds to 843, where it is indicated that the second air inlet valve is stuck open. In other words, because mass air flow did not decrease as expected in response to the second air inlet valve being commanded closed, the likely reason is that the second air inlet valve is stuck open. In such an example, method 800 proceeds to 846. At 846, method 800 includes discontinuing the diagnostic, and further includes updating vehicle operating parameters. For example, similar to that discussed above, updating vehicle operating parameters may include setting a flag at the controller to indicate that the second air inlet valve is stuck open. A MIL may be illuminated at the vehicle dash, to alert the vehicle operator of a request to have the snorkel system of the vehicle serviced to address the degradation. A text-based or audible message may be communicated to the vehicle operator to alert the vehicle operator of the degradation in some examples. The controller may in some examples rely on the secondary air induction pathway for an air source for the engine until the degradation has been mitigated. In other examples, both the primary and the secondary air induction pathways may be relied upon for air induction to the engine. Method 800 may then end.

Returning to 840, in a situation where mass air flow decreased by more than the third threshold decrease, then it may be inferred that the second air inlet valve closed as expected or desired. Proceeding to 846, in a situation where step 846 is reached from step 840, method 800 may include indicating that each of the first air inlet valve and the second air inlet valve are both functioning as desired or expected. The diagnostic may then be discontinued, and the results may be stored at the controller. Method 800 may then end.

Turning now to FIG. 9, a prophetic example timeline 900 is depicted, illustrating how a first and second inlet valve diagnostic may be conducted, according to the methodology laid out above at FIG. 8. Timeline 900 includes plot 905, indicating engine speed, over time. Timeline 900 further includes plot 910, indicating mass air flow as measured, for example via a MAF sensor (e.g., MAF sensor 122 at FIG. 1), over time. Timeline 900 further includes plot 915, indicating a status (fully open or fully closed) of the first air inlet valve (e.g., first air inlet valve 183 at FIG. 1), and plot 920, indicating a status (fully open or fully closed) of the second air inlet valve (e.g., second air inlet valve 184 at FIG. 1), over time. Timeline 900 further includes plot 925, indicating whether there is indication of first air inlet valve degradation (yes or no), and plot 930, indicating whether there is indication of second air inlet valve degradation (yes or no), over time.

At time t0, it may be understood that conditions are not yet met for conducting the diagnostic to assess whether the first air inlet valve and the second air inlet valve are functioning as desired or expected. As one example, conditions not being met may include the vehicle being in motion. At time t0, the first air inlet valve is open (plot 915), and the second air inlet valve is closed (plot 920). While not explicitly illustrated, it may be understood that, at time to, the snorkel system is in a deployed state.

At time t1, conditions are indicated to be met for conducting the diagnostic (refer to step 806 at FIG. 8). Accordingly, at time t1, engine speed is controlled to the predetermined speed for conducting the diagnostic. With engine speed controlled to the predetermined speed, at time t2 the second air inlet valve is commanded open (plot 920). In response to commanding open the second air inlet valve at time t2, between time t2 and t3 mass air flow rises above what is referred to at example timeline 900 as first threshold 911. If mass air flow does not rise above first threshold 911, then it may be inferred that the second air inlet valve did not open, because if it were to have opened as expected, then mass air flow would be expected to increase above the first threshold 911. Because for this example timeline 900 mass air flow increases above the first threshold responsive to commanding open the second air inlet valve, it is inferred that the second air inlet valve is not stuck closed.

At time t3, conditions are indicated to be met for closing the first air inlet valve, and accordingly, the first air inlet valve is commanded closed (plot 915). Responsive to closing the first air inlet valve, mass air flow decreases between time t3 and t4 to below second threshold 912. If mass air flow did not decrease to below second threshold 912, then it may be inferred that the first air inlet valve did not close, because if it were to have closed as expected, then mass air flow would be expected to decrease below the second threshold 912. Because for this example timeline 900 mass air flow decreased to below the second threshold responsive to commanding closed the first air inlet valve, it is inferred that the first air inlet valve is not stuck open.

At time t4, conditions are indicated to be met for reopening the first air inlet valve. It may be unlikely that the valve has issues in opening, as the valve was open just prior to starting the diagnostic. However, in some examples, sticking of the valve in the closed position during the course of the diagnostic could occur. Thus, in some examples, if mass air flow does not rise above fourth threshold 913 in response to commanding open the first air inlet valve, then it may be inferred that the first air inlet valve has become stuck closed. In this example timeline 900 however, mass air flow rises above fourth threshold 914 between time t4 and t5, responsive to the first air inlet valve being commanded open while the second air inlet valve is maintained open. Accordingly, the first air inlet valve is not inferred to be stuck closed.

At time t5, conditions are indicated to be met for commanding closed the second air inlet valve. Accordingly, at time t5 the second air inlet valve is commanded closed (plot 920). Between time t5 and t6, mass air flow drops below third threshold 914. If mass air flow did not drop below third threshold 914, then it may be inferred that the second air inlet valve did not closed, and instead is stuck open. However, in this example, because mass air flow drops below the third threshold 914 in response to the second air inlet valve being commanded closed while the first air inlet valve is maintained open, it is inferred that the second air inlet valve is not stuck open.

At time t6, with the open and closed states of each of the first air inlet valve and the second air inlet valve diagnosed, conditions are indicated to be met for discontinuing the diagnostic. Accordingly, engine speed is controlled to the speed the engine was rotating at prior to conducting the diagnostic, and the diagnostic ends.

It is herein recognized that in some examples there may be circumstances where there may be a potential for water or other fluid (e.g., mud) or particulate matter being ingested into the engine via the primary air induction pathway, but where the vehicle operator may not acknowledge this possibility. It may thus be desirable in some examples to enable a controller of the vehicle to infer whether it may be desirable to deploy a snorkel associated with the vehicle snorkel system.

Turning to FIG. 10, depicted is a high level example method 1000, for controlling a snorkel system of the present disclosure based on the controller of the vehicle inferring that it may be desirable to rely on the snorkel system for routing air into the intake system of the engine of the vehicle. Method 1000 is discussed with regard to automatically deployable snorkel systems of the present disclosure, such as the snorkel systems discussed above with regard to FIGS. 4-5C. However, it may be understood that in other examples similar methodology as that discussed with regard to method 1000 may be utilized for an at least partially manually deployable snorkel system, such as the snorkel system discussed above with regard to FIGS. 3A-3B, without departing from the scope of this disclosure.

Method 1000 will be described with reference to the systems described herein and shown in FIGS. 1-5D, though it should be understood that similar methods may be applied to other systems without departing from the scope of this disclosure. Method 1000 may be carried out by a controller, such as controller 12 in FIG. 1, and may be stored at the controller as executable instructions in non-transitory memory. Instructions for carrying out method 1000 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such as a powered access door (e.g., powered access door 422 at FIG. 4, or powered access door 520 at FIGS. 5A-5C), snorkel body rotation mechanism (e.g., rotation mechanism 420 at FIG. 4), snorkel body elongation apparatus (e.g., elongation apparatus 530 at FIGS. 5A-5C), a first air inlet valve (e.g., first air inlet valve 183 at FIG. 1), a second air inlet valve (e.g., second air inlet valve 184 at FIG. 1), etc., to alter states of devices in the physical world according to the methods depicted below.

Method 1000 begins at 1005, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 1010, method 1000 includes monitoring tire pressure and barometric pressure. It may be understood that tire pressure may be continuously (e.g., at regular or predetermined intervals) monitored via tire pressure monitoring sensors (e.g., tire pressure monitoring sensors 197 at FIG. 1). Similarly barometric pressure may be continuously (e.g., at regular or predetermined intervals) monitored via a dedicated barometric pressure sensor (e.g., barometric pressure sensor 189 at FIG. 1).

Proceeding to 1015, method 1000 includes indicating whether there is a tire pressure decrease greater than a first threshold tire pressure decrease, without an accompanying or corresponding barometric pressure decrease. It may be understood that the tire pressure decrease may include all four tires of the vehicle, or in some examples may include just both tires of the front wheels, or both tires of the rear wheels. This may rule out a circumstance where one tire deflates due to, for example, degradation of the tire. If not, then method 1000 proceeds to 1020, where method 1000 includes maintaining current operating conditions. Maintaining current operating conditions may include continuing to rely on air ingestion to the engine by way of the primary air induction pathway, and to not deploy the snorkel associated with the vehicle snorkel system. Method 1000 may then end. While depicted as ending, it may be understood that method 1000 may continually repeat during the course of a drive cycle to infer whether there is a tire pressure decrease by greater than the first threshold tire pressure decrease without a corresponding barometric pressure increase.

Returning to 1015, responsive to an indication of a tire pressure decrease by more than the first threshold tire pressure decrease without a corresponding barometric pressure increase, method 1000 proceeds to 1025. At 1025, method 1000 includes requesting confirmation from the vehicle operator to deploy the snorkel associated with the vehicle snorkel system. Specifically, it may be understood that a tire pressure decrease without a corresponding increase in barometric pressure may be indicative of the tires suddenly coming into contact with a substantial amount of water, such as may occur when the vehicle has entered into a stream, river, puddle, etc. In response to such an indication, it may be beneficial to deploy the snorkel associated with the snorkel system, in order to rely on air induction to the engine via the secondary air induction pathway. In doing so, ingestion of fluid into the engine via the primary air induction pathway may be avoided.

However, it may not be desirable to a vehicle operator if the snorkel is commanded to be automatically deployed without the vehicle operator confirming the snorkel deployment request in the affirmative. Accordingly, the request for confirmation may be generated by the controller, and communicated to the vehicle operator via the HMI, for example. In some examples, an audible request may additionally or alternatively be used. In response to the request, the vehicle operator may confirm the request to deploy the snorkel by interacting with the HMI. For example, the vehicle operator may select an option provided via the HMI to confirm the request.

Thus, proceeding to 1030, method 1000 queries whether confirmation has been received by the vehicle operator. If not, method 1000 proceeds to 1020, where current operating conditions may be maintained. Specifically, the vehicle may be continued to be operated without snorkel deployment, where air induction to the engine is via the primary air induction pathway. Method 1000 may then end. While depicted as ending, it may be understood that method 1000 may continue to repeat throughout a drive cycle without departing from the scope of this disclosure.

Returning to 1030, responsive to confirmation of the request being received at the controller from the vehicle operator, method 1000 proceeds to 1035. At 1035, method 1000 includes deploying the snorkel associated with the snorkel system to its final, deployed position, discussed in detail above with regard to FIG. 4-FIG. 5C. With the snorkel deployed, method 1000 proceeds to 1040, where the controller commands open the second air inlet valve and commands closed the first air inlet valve. It may be understood that commanding open the second air inlet valve and commanding closed the first air inlet valve may occur simultaneously in some examples. In other examples, the second air inlet valve may be commanded open just prior (e.g. within a second or less) of commanding closed the first air inlet valve, to ensure a steady supply of air to the engine while the state of the first and second air inlet valves is changed. The vehicle may then be operated via inducting air into the engine via the secondary air induction pathway.

Proceeding to 1045, method 1000 includes indicating whether there is a tire pressure increase greater than a second threshold tire pressure increase for greater than a predetermined duration. If not, method 1000 continues to monitor for a tire pressure increase greater than the second threshold tire pressure increase. Alternatively, in response to an indication of a tire pressure increase greater than the second threshold tire pressure increase for longer than the predetermined duration, method 1000 proceeds to 1050. At 1050, method 1000 includes requesting confirmation from the vehicle operator as to whether to retract the snorkel associated with the vehicle snorkel system. The request may be similar to that discussed above, and may include a text-based message via the HMI, and audible message over the vehicle sound system, etc.

Proceeding to 1055, method 1000 includes indicating whether confirmation is received at the controller. If not, then method 1000 includes maintaining current operating conditions at 1060. In other words, the snorkel associated with the snorkel system may remain deployed, and air may continue to be routed to the engine by way of the secondary air intake pathway. Method 1000 may then end. In such an example, the vehicle operator may, at a later time, request retraction of the snorkel associated with the vehicle snorkel system as discussed above.

Alternatively, responsive to the confirmation request being received at 1055, method 1000 proceeds to 1065. At 1065, method 1000 includes retracting the snorkel to its original position prior to the deployment of the snorkel, as discussed in detail above. Once retracted, method 1000 proceeds to 1070, and includes commanding closed the second air inlet valve and commanding open the first air inlet valve. It may be understood that the second air inlet valve and the first air inlet valve may be commanded to change states simultaneously, or in another example the first air inlet valve may be commanded open first and then the second air inlet valve may be commanded closed within a threshold duration (e.g., within 1 second) of opening the first air inlet valve, to ensure a steady flow of air to the engine. Method 1000 may then end.

While method 1000 was discussed above with regard to an automatically deployable snorkel system, as discussed similar methodology may be used to call attention to a vehicle operator that it may be desirable to manually assemble a snorkel system for which manual assembly is required (e.g., the snorkel system of FIGS. 3A-3B). For example, in response to a tire pressure decrease greater than the first threshold tire pressure decrease without an accompanying barometric pressure increase, the controller may alert the vehicle operator of a potential for water ingestion into the engine if the primary air induction pathway is relied upon as the source of air for the engine. Then, responsive to the alerting, the vehicle operator may decide if conditions warrant the manual assembly of the vehicle system, and if so, may confirm the manual assembly responsive to the assembling. In similar fashion, the vehicle operator may be alerted as to when conditions are inferred to be met for once again relying on air induction to the engine via the primary air induction pathway, at which point the vehicle operator may determine whether to disassemble the snorkel system as discussed above with regard to FIGS. 3A-3B.

Furthermore, while the method of FIG. 10 is discussed with regard to requesting confirmation from the vehicle operator as to whether to deploy or retract the snorkel, in other examples the deployment and/or retraction may be automatic without relying on vehicle operator input. In some examples, there may be a selectable option that the vehicle operator can select (e.g., via the HMI and/or software application) whether the deployment and/or retraction of the snorkel system can occur without vehicle operator input, or just in response to vehicle operator input. For example, some vehicle operators may prefer the completely automatic nature of snorkel deployment when the controller infers that conditions may be met for deploying the snorkel. However, other vehicle operators may prefer to confirm any request to deploy or retract the snorkel system. In a case where the vehicle operator desires the automatic deployment of the snorkel without operator input, then the snorkel may be deployed responsive to tire pressure decreasing below the first threshold tire pressure decrease without corresponding decrease in barometric pressure, and may be retracted responsive to tire pressure increasing above the second threshold tire pressure increase for greater than the threshold duration of time as discussed above.

Thus, discussed herein, a method may comprise drawing an airflow into an engine of a vehicle solely via a primary air induction pathway by commanding open a first air inlet valve and commanding closed a second air inlet valve, and responsive to a request to draw the airflow into the engine solely via a secondary air induction pathway being received at a controller, commanding closed the first air inlet valve and commanding open the second air inlet valve.

For such a method, the airflow may enter the primary air induction pathway at a lower elevation with respect to the engine of the vehicle as compared to the secondary air induction pathway.

For such a method, the method may further comprise preventing water from entering the engine via forming a watertight seal with the primary air induction pathway responsive to the first air inlet valve being commanded closed.

For such a method, the method may further comprise responsive to receiving the request at the controller and prior to commanding closed the first air inlet valve and commanding open the second air inlet valve, deploying a deployable snorkel that forms a part of the secondary air induction pathway. In such an example, deploying the deployable snorkel may include the controller commanding the deployable snorkel to automatically deploy without manual intervention. In another example, the method may further comprise deploying the deployable snorkel via a manual assembly of the deployable snorkel, and wherein commanding closed the first air inlet valve and commanding open the second air inlet valve occurs subsequent to a confirmation being received at the controller that the deployable snorkel has been manually assembled.

For such a method, the method may further comprise communicating the request to the controller via a vehicle operator performing an action to submit the request to the controller. In such an example, the action may be one of submitting the request via a human machine interface located in a cabin of the vehicle, via a computing device running a software application, and an actuatable switch located in the cabin of the vehicle.

For such a method, the method may further comprise communicating the request to the controller based on an indication that the vehicle is in a location where drawing the airflow into the engine solely via the primary air induction pathway can result in water or other fluid or particulate matter being drawn into the engine by way of the primary air induction pathway. In such an example, the indication may be a change in a pressure of tires of the vehicle by more than a predetermined threshold change that is not accompanied by a corresponding increase in barometric pressure.

Turning now to FIG. 11, a prophetic example timeline 1100 is depicted, illustrating how the method of FIG. 10 may be used to deploy and retract a snorkel associated with a snorkel system of the present disclosure. Timeline 1100 includes plot 1105, indicating a vehicle speed, over time. Timeline 1100 further includes plot 1110, indicating barometric pressure, as monitored via, for example, the barometric pressure sensor (e.g., barometric pressure sensor 189 at FIG. 1). Timeline 1100 further includes plot 1115, indicating tire pressure, over time. With regard to timeline 1100, it may be understood that plot 1115 refers to tire pressure of all the vehicle tires. Timeline 1100 further includes plot 1120, indicating a status of the first air inlet valve (e.g., first air inlet valve 183 at FIG. 1), over time. Timeline 1100 further includes plot 1125, indicating a status of the second air inlet valve (e.g., second air inlet valve 184 at FIG. 1), over time. For each of plots 1120 and 1125, the valve status may be fully open or fully closed. Timeline 1100 further includes plot 1130, indicating a status of a deployable snorkel associated with the snorkel system of the vehicle, over time. The snorkel may be either deployed, or retracted, over time.

At time t0, the vehicle is in motion (plot 1105), the first air inlet valve is open (plot 1120) and the second air inlet valve is closed (plot 1125). Furthermore, the snorkel is not yet deployed (plot 1130). Tire pressure is at a determined level as monitored via the tire pressure sensor(s) (plot 1115), and barometric pressure (plot 1110) is being monitored via the barometric pressure sensor.

At time t1, tire pressure begins to drop, and at time t2 tire pressure drops below the first threshold tire pressure decrease (line 1116). However, a corresponding barometric pressure increase is not indicated between time t1 and t2 (refer to plot 1110). Accordingly, the vehicle controller infers that conditions are potentially appropriate for deploying the snorkel associated with the snorkel system so as to switch from inducting air into the engine via the primary air induction pathway, to inducting air into the engine via the secondary air induction pathway. While not explicitly illustrated, as discussed with regard to FIG. 10, in some examples the controller may request confirmation as to whether to deploy the snorkel. However, in this example timeline 1100, the deployment and retraction of the snorkel may occur automatically, without relying on operator input.

Accordingly, at time t2, responsive to the indication that tire pressure has decreased to below the first threshold tire pressure decrease, the controller commands the snorkel to deploy (plot 1130). Accordingly, the snorkel deploys from its retracted position to its deployed position between time t2 and t3.

With the snorkel deployed, at time t3, the controller commands the first air inlet valve closed (plot 1120), and the second air inlet valve open (plot 1125). Accordingly, between time t3 and t4, air induction to the engine is via the second air induction pathway. In other words, air is inducted to the engine via the snorkel system and not via the primary air induction pathway.

At time t4, tire pressure begins to rise, and at time t5 tire pressure is indicated to cross the second threshold tire pressure increase (line 1117). A timer is set at time t5, in order to infer whether tire pressure is maintained above the second threshold for longer than the predetermined duration (line 1118). At time t6, the threshold duration elapses, and accordingly it is inferred that conditions are no longer met for relying on the induction of air into the engine by way of the secondary air induction pathway. Accordingly, the first air inlet valve is commanded open (plot 1120) and the second air inlet valve is commanded closed (plot 1125). With the first air inlet valve open and the second air inlet valve closed, the controller commands the snorkel be retracted beginning at time t7. After time t7 the snorkel adopts its fully retracted position, and air induction to the engine is via the primary air induction pathway.

In this way, a vehicle may include an option to rely on a secondary air induction pathway via a snorkel system without having to have the snorkel permanently visible from a position external to the vehicle, which may be desirable to certain vehicle operators that also (e.g., more frequently) use the vehicle for other activities for which a snorkel is not necessary. Such an option enables the engine to rely on air supplied via the primary induction pathway during most operating conditions, and to switch over to relying on the secondary air induction pathway when desired.

The technical effect of a vehicle snorkel system with an ability to be deployed when desired, and for which control over whether air induction to the engine is via the primary air induction pathway or the secondary air induction pathway is exerted by a controller of the vehicle, is that switching between the two modes of engine operation may be easy and intuitive to a vehicle operator, which may reduce opportunity for undesired ingestion of water or other fluid/particulate matter to be ingested into the engine, which may in turn improve engine lifetime. A technical effect of relying on valves under control of the controller to switch from a situation where air is inducted to the engine via the primary pathway to a situation where air is inducted to the engine via the secondary pathway, is that in some examples the switching may take place automatically, without a need for vehicle operator input. A technical effect of having an automatically deployable snorkel is that a vehicle operator may not have to exit the vehicle in order to switch from relying on the primary air induction pathway to relying on the secondary air induction pathway. This may be advantageous in certain situation where it may not be desirable to exit the vehicle in order to assemble a snorkel system and/or where time is a factor.

The systems and methods as discussed herein may enable one or more systems and one or more methods. As one example, a method comprises drawing an airflow into an engine of a vehicle solely via a primary air induction pathway by commanding open a first air inlet valve and commanding closed a second air inlet valve; and responsive to a request to draw the airflow into the engine solely via a secondary air induction pathway being received at a controller, commanding closed the first air inlet valve and commanding open the second air inlet valve. In a first example of the method, the method includes wherein the airflow enters the primary air induction pathway at a lower elevation with respect to the engine of the vehicle as compared to the secondary air induction pathway. A second example of the method optionally includes the first example, and further comprises preventing water from entering the engine via forming a watertight seal with the primary air induction pathway responsive to the first air inlet valve being commanded closed. A third example of the method optionally includes any one or more or each of the first through second examples, and further comprises responsive to receiving the request at the controller and prior to commanding closed the first air inlet valve and commanding open the second air inlet valve, deploying a deployable snorkel that forms a part of the secondary air induction pathway. A fourth example of the method optionally includes any one or more or each of the first through third examples, and further includes wherein deploying the deployable snorkel includes the controller commanding the deployable snorkel to automatically deploy without manual intervention. A fifth example of the method optionally includes any one or more or each of the first through fourth examples, and further comprises deploying the deployable snorkel via a manual assembly of the deployable snorkel; and wherein commanding closed the first air inlet valve and commanding open the second air inlet valve occurs subsequent to a confirmation being received at the controller that the deployable snorkel has been manually assembled. A sixth example of the method optionally includes any one or more or each of the first through fifth examples, and further comprises communicating the request to the controller via a vehicle operator performing an action to submit the request to the controller. A seventh example of the method optionally includes any one or more or each of the first through sixth examples, and further includes wherein the action is one of submitting the request via a human machine interface located in a cabin of the vehicle, via a computing device running a software application, and an actuatable switch located in the cabin of the vehicle. An eighth example of the method optionally includes any one or more or each of the first through seventh examples, and further comprises communicating the request to the controller based on an indication that the vehicle is in a location where drawing the airflow into the engine solely via the primary air induction pathway can result in water or other fluid or particulate matter being drawn into the engine by way of the primary air induction pathway. A ninth example of the method optionally includes any one or more or each of the first through eight examples, and further includes wherein the indication is a change in a pressure of tires of the vehicle by more than a predetermined threshold change that is not accompanied by a corresponding increase in barometric pressure.

Another method for a vehicle comprises automatically deploying a snorkel associated with a vehicle snorkel system in response to a first request to deploy the snorkel being received at a controller of the vehicle; and automatically retracting the snorkel in response to a second request to retract the snorkel being received at the controller. In a first example of the method, the method further comprises routing an airflow to an engine of the vehicle via a primary air induction pathway and not via the snorkel system during conditions where the snorkel is retracted; and routing the airflow to the engine via the snorkel system and not via the primary air induction pathway during conditions where the snorkel is deployed. A second example of the method optionally includes the first example, and further comprises commanding closed a first air inlet valve included in the primary air induction pathway and commanding open a second air inlet valve associated with the snorkel system to route the airflow to the engine via the snorkel system; and commanding closed the second air inlet valve and commanding open the first air inlet valve to route the airflow to the engine via the primary air induction pathway. A third example of the method optionally includes any one or more or each of the first through second examples, and further comprises commanding open an access door of the vehicle to allow the snorkel to deploy from a first, retracted position to a second, deployed position responsive to the first request; and commanding closed the access door responsive to an indication that the snorkel has adopted the first, retracted position responsive to the second request. A fourth example of the method optionally includes any one or more or each of the first through third examples, and further includes wherein the first request and the second request include an input to the controller from a vehicle operator.

In another embodiment, a system for a vehicle comprises a snorkel system that includes a deployable snorkel, a snorkel deployment system, and a controller with computer readable instructions stored on non-transitory memory that when executed, cause the controller to receive a request to deploy the snorkel, and command the snorkel deployment system to deploy the snorkel from a first, retracted position to a second, deployed position and in response to a request to retract the snorkel, command the snorkel deployment system to retract the snorkel from the second position back to the first position. As one example, the snorkel may deploy in a substantially vertical direction with respect to a vertical axis of the vehicle. As another example the snorkel may deploy at an angle with respect to the vertical axis of the vehicle. As another example, the snorkel may, in its first position, be substantially side-to-side with respect to a side-to-side axis of the vehicle, and may be substantially vertical with respect to the vertical axis in its second, deployed position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
drawing an airflow into an engine of a vehicle solely via a primary air induction pathway by commanding open a first air inlet valve and commanding closed a second air inlet valve;
responsive to a request to draw the airflow into the engine solely via a secondary air induction pathway being received at a controller, commanding closed the first air inlet valve and commanding open the second air inlet valve;
responsive to receiving the request at the controller and prior to commanding closed the first air inlet valve and commanding open the second air inlet valve, deploying a deployable snorkel that forms a part of the secondary air induction pathway; and
deploying the deployable snorkel via a manual assembly of the deployable snorkel,
wherein commanding closed the first air inlet valve and commanding open the second air inlet valve occurs subsequent to a confirmation being received at the controller that the deployable snorkel has been manually assembled.

2. The method of claim 1, wherein the airflow enters the primary air induction pathway at a lower elevation with respect to the engine of the vehicle as compared to the secondary air induction pathway.

3. The method of claim 1, further comprising preventing water from entering the engine via forming a watertight seal with the primary air induction pathway responsive to the first air inlet valve being commanded closed.

4. The method of claim 1, further comprising communicating the request to the controller via a vehicle operator performing an action to submit the request to the controller.

5. The method of claim 4, wherein the action is one of submitting the request via a human machine interface located in a cabin of the vehicle, via a computing device running a software application, and an actuatable switch located in the cabin of the vehicle.

6. The method of claim 1, further comprising communicating the request to the controller based on an indication that the vehicle is in a location where drawing the airflow into the engine solely via the primary air induction pathway can result in water or other fluid or particulate matter being drawn into the engine by way of the primary air induction pathway.

7. The method of claim 6, wherein the indication is a change in a pressure of tires of the vehicle by more than a predetermined threshold change that is not accompanied by a corresponding increase in barometric pressure.

8. A method for a vehicle, comprising:
automatically deploying a snorkel associated with a vehicle snorkel system in response to a first request to deploy the snorkel being received at a controller of the vehicle; and
automatically retracting the snorkel in response to a second request to retract the snorkel being received at the controller.

9. The method of claim 8, further comprising routing an airflow to an engine of the vehicle via a primary air induction pathway and not via the snorkel system during conditions where the snorkel is retracted; and routing the airflow to the engine via the snorkel system and not via the primary air induction pathway during conditions where the snorkel is deployed.

10. The method of claim 9, further comprising commanding closed a first air inlet valve included in the primary air induction pathway and commanding open a second air inlet valve associated with the snorkel system to route the airflow to the engine via the snorkel system; and commanding closed the second air inlet valve and commanding open the first air inlet valve to route the airflow to the engine via the primary air induction pathway.

11. The method of claim 8, further comprising commanding open an access door of the vehicle to allow the snorkel to deploy from a first, retracted position to a second, deployed position responsive to the first request; and commanding closed the access door responsive to an indication that the snorkel has adopted the first, retracted position responsive to the second request.

12. The method of claim 8, wherein the first request and the second request include an input to the controller from a vehicle operator.

13. A system for a vehicle, comprising:

a primary air induction pathway for providing an airflow to an engine of the vehicle, the primary air induction pathway including a first air inlet valve;

a deployable snorkel associated with a snorkel system for providing air to an engine of the vehicle via the snorkel system, the snorkel system including a second air inlet valve; and a controller with computer readable instructions stored on non-transitory memory that when executed, cause the controller to:

command the first air inlet valve open and the second air inlet valve closed to route air to the engine via the primary air induction pathway;

receive a request to deploy the snorkel;

indicate that the snorkel is deployed; and command the second air inlet valve open and then command the first air inlet valve closed to supply the engine with the airflow via the snorkel system and not the primary air induction pathway.

14. The system of claim 13, further comprising a snorkel deployment system and a powered access door of the vehicle: and wherein the controller stores further instructions to, in response to receiving the request to deploy the snorkel, command open the powered access door and command the snorkel deployment system to deploy the snorkel from a first, retracted position to a second, deployed position.

15. The system of claim 13, further comprising an access panel for accessing a permanent snorkel body section of the snorkel system, and wherein the snorkel is a removable snorkel that is deployed by manually coupling the removable snorkel to the permanent snorkel body section of the snorkel system; and wherein the controller stores further instructions to receive the indication that the snorkel is deployed by way of a vehicle operator submitting a confirmation via a human machine interface in a cabin of the vehicle that the removable snorkel has been manually coupled to the permanent snorkel body section.

16. The system of claim 13, further comprising tire pressure sensors coupled to tires of the vehicle;

a barometric pressure sensor; and wherein the controller stores further instructions to receive the request to deploy the snorkel in response to an indication of a tire pressure decrease by greater than a predetermined threshold decrease without a corresponding increase in barometric pressure, the tire pressure decrease monitored by the tire pressure sensors and the barometric pressure monitored via the barometric pressure sensor.

17. The system of claim 13, further comprising:

a mass air flow sensor positioned in an air intake system of the engine; and wherein the controller stores further instructions to receive a request to conduct a diagnostic to infer whether the first air inlet valve and the second air inlet valve are functioning as desired or expected; and in response to conditions being met for conducting the diagnostic, conduct the diagnostic by manipulating an open state and a closed state of each of the first air inlet valve and the second air inlet valve in a predetermined order while monitoring the airflow to the engine via the mass air flow sensor; and indicate degradation of one of the first air inlet valve or the second air inlet valve based on a deviation in the mass air flow from an expected mass air flow as a function of the predetermined order in which the first air inlet valve and the second air inlet valve are each controlled to the open state and the closed state.

18. A method comprising:

drawing an airflow into an engine of a vehicle solely via a primary air induction pathway by commanding open a first air inlet valve and commanding closed a second air inlet valve;

responsive to a request to draw the airflow into the engine solely via a secondary air induction pathway being received at a controller, commanding closed the first air inlet valve and commanding open the second air inlet valve; and communicating the request to the controller based on an indication that the vehicle is in a location where drawing the airflow into the engine solely via the primary air induction pathway can result in water or other fluid or particulate matter being drawn into the engine by way of the primary air induction pathway, wherein the indication is a change in a pressure of tires of the vehicle by more than a predetermined threshold change that is not accompanied by a corresponding increase in barometric pressure.

* * * * *